US012783792B2

(12) United States Patent
Kumbhar et al.

(10) Patent No.: US 12,783,792 B2
(45) Date of Patent: Nov. 3, 2026

(54) SYSTEM AND METHOD FOR REDUCING TIME TAKEN FOR EVALUATION OF AN INTERACTION THAT HAS BEEN RECORDED BY A RECORDING-PLAYER WEB-APPLICATION BY USING GENERATIVE AI WITH LARGE LANGUAGE MODELS

(71) Applicant: NICE LTD., Ra'anana (IL)

(72) Inventors: Rohit Kumbhar, Pune (IN); Onkar Hingne, Pune (IN); Rajat Gupta, Pune (IN); Priyanka Shelke, Pune (IN); Shital Menkudle, Pune (IN)

(73) Assignee: NICE LTD., Ra'anana (IL)

(*) Notice: Subject to any disclaimer, the term of this patent is extended or adjusted under 35 U.S.C. 154(b) by 379 days.

(21) Appl. No.: 18/591,068

(22) Filed: Feb. 29, 2024

(65) Prior Publication Data

US 2025/0278555 A1 Sep. 4, 2025

(51) Int. Cl.
*G06F 3/048* (2013.01)
*G06F 40/169* (2020.01)
(Continued)

(52) U.S. Cl.
CPC .......... *G06F 40/169* (2020.01); *G06F 40/284* (2020.01); *G06F 40/40* (2020.01); *H04N 21/8456* (2013.01)

(58) Field of Classification Search
CPC ...... G06F 40/169; G06F 40/284; G06F 40/40; H04N 21/8456
See application file for complete search history.

(56) References Cited

U.S. PATENT DOCUMENTS 9,712,665 B2 * 7/2017 Adar .................... G07F 19/207
10,320,866 B2 * 6/2019 Matejka ................. H04L 65/61
(Continued)

FOREIGN PATENT DOCUMENTS

AU 2016231593 B1 * 12/2016
WO WO-2024096905 A1 * 5/2024 .......... H04L 65/612

*Primary Examiner* — Rashawn N Tillery
(74) *Attorney, Agent, or Firm* — Soroker Nordman Riba

(57) ABSTRACT

A computerized-method for reducing time of evaluation of an interaction by annotating a media-file of the interaction based on an evaluation-measurement. The computerized-method includes: (i) receiving a request from a user to playback the media-file of the interaction by operating a media-playback service of a recording-player web-application; (ii) configuring the media-playback service to: a. operate an interaction-insights module to generate point-in-time annotations of the media-file, based on parameters of the evaluation-measurement; and b. send the point-in-time annotations and a location of the media-file to the recording-player web-application; and (iii) configuring the recording-player web-application to playback the media-file and upon user-selection to present each point-in-time annotation of the one or more point-in-time annotations, via a UI that is associated to the recording-player web-application, on a timeline-bar as an annotation-marker. Each point-in-time annotation comprising a playhead position in the media-file and a text-annotation related to a parameter of the parameters of the evaluation-measurement.

21 Claims, 21 Drawing Sheets

100A

100B

(51) Int. Cl.
*G06F 40/284* (2020.01)
*G06F 40/40* (2020.01)
*H04N 21/845* (2011.01)

(56) References Cited

U.S. PATENT DOCUMENTS

| | | | | |
|---|---|---|---|---|
| 2006/0085735 | A1* | 4/2006 | Shimizu | G06F 40/169 715/201 |
| 2007/0266304 | A1* | 11/2007 | Fletcher | G06F 40/169 715/230 |
| 2014/0108842 | A1* | 4/2014 | Frank | G06F 1/3212 713/323 |
| 2015/0032697 | A1* | 1/2015 | Abdo | G06F 16/40 707/634 |
| 2015/0046822 | A1* | 2/2015 | Kitch | G06F 3/0482 715/721 |
| 2016/0019202 | A1* | 1/2016 | Adams | H04N 21/8547 704/9 |
| 2017/0083620 | A1* | 3/2017 | Chew | G06F 16/345 |
| 2018/0176661 | A1* | 6/2018 | Varndell | H04N 21/2187 |
| 2019/0362022 | A1* | 11/2019 | Haukioja | G10L 15/04 |
| 2021/0281906 | A1* | 9/2021 | Kiryanov | H04N 21/8456 |
| 2022/0374585 | A1* | 11/2022 | Wang | G11B 27/34 |
| 2022/0383026 | A1* | 12/2022 | Moton, Jr. | G06V 20/20 |
| 2022/0398375 | A1* | 12/2022 | Datar | G06F 40/169 |
| 2023/0230589 | A1* | 7/2023 | Giovanardi | G06F 40/30 704/232 |
| 2024/0354493 | A1* | 10/2024 | Nakajima | G10L 17/18 |
| 2025/0006201 | A1* | 1/2025 | Adlersberg | G06T 11/26 |
| 2025/0030903 | A1* | 1/2025 | Kolesa | H04N 21/242 |
| 2025/0193268 | A1* | 6/2025 | Malik | H04L 67/02 |
| 2025/0226914 | A1* | 7/2025 | Yang | H04L 1/0041 |
| 2026/0212118 | A1* | 7/2026 | Roitman | G06F 40/20 |
| 2026/0220129 | A1* | 7/2026 | Mishra | G06F 16/24522 |

* cited by examiner

800

Extract from transcript relevant to the code below :
[2023-07-14 10:01:05 AM] Agent: Please confirm that your phone number is 8006543215
[2023-07-14 10:10:51 AM] Customer: Yes Step 1 : Ask prompt Question
questions = {"role":"user", "content":"Did agent asked demographic question or did agent identified customer identity (give answer in yes or no)? and is there a phone number asked by agent in the transcript and whose phone number is it at what timestamp? and is there an address asked by agent in the transcript and whose address is it at what timestamp? and is there an DOB asked by agent in the transcript and whose DOB is it at what timestamp? generate answer in points and phone number in (), address in <>, dob in $$ and timestamp in [] with format [YYYY-MM-DD HH:MM:SS AM/PM]"}

Step 2:
Split the response and extract phone_number, phoneNumberTimestamp , addressObject, addressTimestamp Step 3:
From the output of #1 find the participant Who Gave PhoneNumber and the participant Who Gave Address Step 4:
If participantWhoGavePhoneNumber = Agent, Then Add a annotation as
{"timestamp" : phoneNumberTimestamp, "suggestion" : "The agent should have refrained from disclosing the customer's phone number and instead encouraged the customer to provide it themselves.", "suggestion": "Instead, agent could have politely requested the customer to provide the phone number." , }

If participantWhoGaveAddress = Agent , Then Add a annotation as
{"timestamp" : addressTimestamp, "suggestion" :"The agent should have avoided sharing the customer's address and instead advised the customer to provide it themselves if necessary.", "suggestion":"Indeed, the agent should have politely requested the customer to provide their address." }

Figure 8

900

Extract from transcript relevant to the code below :
[2023-07-14 10:01:05 AM] Agent: Please confirm that your phone number is 8006543215
[2023-07-14 10:10:51 AM] Customer: Yes Step 1 : Ask prompt Question
question = {"role":"user","content":"IS the customer complaining about something in this conversation? Answer in Yes or No format"}

Step 2:
If Answer to above questions is Yes
question = {"role":"user", "content":"Did the agent show empathy towards the customer? Did the agent apologize upon hearing the customer's issue? Answer in Yes or No format and justify your answer"}
Store the answer to this question in variable MESSAGE Step 3:
If the answer to #2 is No
question = {"role":"user","content":"Give reference from the transcript where the agent was unempathetic and also provide suggestion with <suggestion> tag and not include any timestamp or role in it?"}

Step 4:
Extract Suggestion and Timestamp from the prompt answer #3

Step 5:
Create a annotation with of the format
{"timestamp" : <timestamp in step 4> , "message" : <MESSAGE from step 2> , "suggestion" : <suggestion from GPT in step 3 >

Figure 9

1800

[2023-11-08 10:00:48 AM] IVR: Thank you for calling ABC Electronics. For English, press 1. Para español, oprima el 2.
[2023-11-08 10:00:58 AM] Customer (Presses 1):
[2023-11-08 10:01:00 AM] IVR: To check the status of an existing order, press 1. For technical support, press 2. To speak with a representative, press 3.
[2023-11-08 10:01:30 AM] Customer (Presses 3):
[2023-11-08 10:01:32 AM] Representative: Good morning, This is Tom, how can I help?
[2023-11-08 10:01:38 AM] Customer: Hello, I need help with my recent order.
[2023-11-08 10:01:46 AM] Representative: Sure, I'd be happy to assist you with that. May I have your order number, please?
[2023-11-08 10:02:02 AM] Customer: Of course, it's 123456789.
[2023-11-08 10:02:10 AM] Representative: Thank you. Let me pull up your order information. While I do that, may I have your name for verification, please?
[2023-11-08 10:02:43 AM] Customer: My name is John Smith.
[2023-11-08 10:02:55 AM] Representative: Thank you, John. Just give me a moment to access your order details.
[2023-11-08 10:03:00 AM] Representative: on hold
[2023-11-08 10:03:25 AM] Representative: I've found your order. It looks like you ordered a laptop. How can I assist you with it?
[2023-11-08 10:03:55 AM] Customer: The laptop arrived, but there seems to be a problem with the screen. It's flickering.
[2023-11-08 10:04:15 AM] Representative: I'm sorry to hear that. Let's try to resolve this issue for you. Have you tried any troubleshooting steps yet, like restarting the laptop?
[2023-11-08 10:04:30 AM] Customer: Yes, I've tried that, but the problem persists.
[2023-11-08 10:04:42 AM] Representative: Thank you for letting me know. It sounds like a hardware issue. I'll arrange for a return and replacement of the laptop. Can you confirm your shipping address?
[2023-11-08 10:05:00 AM] Customer: My address is 123 Main Street, Anytown, USA.
[2023-11-08 10:05:10 AM] Representative: Great, I've updated the information. We'll send you a return label, and once we receive the faulty laptop, we'll send out a replacement. Is there anything else I can assist you with?
[2023-11-08 10:05:57 AM] Customer: No, that's all. Thank you for your help.
[2023-11-08 10:06:07 AM] Representative: You're welcome, John. If you have any further questions or concerns, please don't hesitate to reach out. Have a great day!
[2023-11-08 10:06:25 AM] Customer: You too. Goodbye!
[2023-11-08 10:06:30 AM] Representative: Goodbye, and have a wonderful day!

Figure 18

1900

1. Welcome Message and Language Selection - [2023-11-08 10:00:48 AM - 2023-11-08 10:00:58 AM]
2. Customer Chooses Language - [2023-11-08 10:00:58 AM - 2023-11-08 10:01:00 AM]
3. Options for Assistance - [2023-11-08 10:01:00 AM - 2023-11-08 10:01:30 AM]
4. Customer Chooses to Speak with a Representative - [2023-11-08 10:01:30 AM - 2023-11-08 10:01:32 AM]
5. Representative Introduction - [2023-11-08 10:01:32 AM - 2023-11-08 10:01:38 AM]
6. Customer States Issue - [2023-11-08 10:01:38 AM - 2023-11-08 10:01:46 AM]
7. Request for Order Number - [2023-11-08 10:01:46 AM - 2023-11-08 10:02:02 AM]
8. Customer Provides Order Number - [2023-11-08 10:02:02 AM - 2023-11-08 10:02:10 AM]
9. Verification and Request for Name - [2023-11-08 10:02:10 AM - 2023-11-08 10:02:43 AM]
10. Customer Provides Name - [2023-11-08 10:02:43 AM - 2023-11-08 10:02:55 AM]
11. Order Information Retrieval - [2023-11-08 10:02:55 AM - 2023-11-08 10:03:00 AM]
12. On Hold - [2023-11-08 10:03:00 AM - 2023-11-08 10:03:25 AM]
13. Resolution Offered - [2023-11-08 10:03:25 AM - 2023-11-08 10:03:55 AM]
14. Customer Describes Issue - [2023-11-08 10:03:55 AM - 2023-11-08 10:04:15 AM]
15. Troubleshooting - [2023-11-08 10:04:15 AM - 2023-11-08 10:04:30 AM]
16. Customer Confirms Troubleshooting - [2023-11-08 10:04:30 AM - 2023-11-08 10:04:42 AM]
17. Arranging Return and Replacement - [2023-11-08 10:04:42 AM - 2023-11-08 10:05:00 AM]
18. Customer Provides Address - [2023-11-08 10:05:00 AM - 2023-11-08 10:05:10 AM]
19. Confirmation and Farewell - [2023-11-08 10:05:10 AM - 2023-11-08 10:05:57 AM]
20. Customer Expresses Gratitude - [2023-11-08 10:05:57 AM - 2023-11-08 10:06:07 AM]
21. Closing Remarks - [2023-11-08 10:06:07 AM - 2023-11-08 10:06:25 AM]

Figure 19

SYSTEM AND METHOD FOR REDUCING TIME TAKEN FOR EVALUATION OF AN INTERACTION THAT HAS BEEN RECORDED BY A RECORDING-PLAYER WEB-APPLICATION BY USING GENERATIVE AI WITH LARGE LANGUAGE MODELS

TECHNICAL FIELD

The present disclosure relates to annotation of playback of audio and video recordings, and more specifically, to reducing time taken for evaluation of an interaction by annotating a media-file of the interaction that has been recorded by a recording-player web-application based on an evaluation-measurement.

BACKGROUND

In contact centers, supervisors, and evaluators review interaction documentations, such as call-recordings, screen recordings and digital text interactions for quality assurance and evaluation purposes. For each documented interaction, they have to either listen to the entire call-recording and watch the video of the screen recording or watch the recorded screen with the text of the digital text interaction on the side, to find areas with issues. However, while they are searching for the issues, they don't know what to look for and in which point of time in the call-recording or the recorded screen they should listen via the audio-player or read the text of the digital interaction, to find the issues.

Moreover, current technical solutions don't enable user interaction with the media-player to search the audio file of the call-recording or the recorded screen with the text of the digital interaction, based on questions about the content of the interaction that is in the call-recording, or the content of the digital text interaction to get to the point in the call-recording or the recorded screen with the text of the interaction, where there might be issues and to save time instead of listening to the entire call-recording or reviewing the entire text of the digital text interaction.

In current technical solutions of media-players which are associated to an application, such as a Quality Management (QM) application, users enter and edit annotations during the evaluation process of the interaction, when they listen to the call-recording or review the digital screen of the digital text interaction, which involves many toggling of repeated play and pause, in order to enter those annotations in a point in time for issues that they have identified in the content of the interaction and suggestions. This toggling of play and pause of the call-recording may break the flow of the agents work and also may be computer resources and time-consuming. The toggling increases the computer resource, e.g., memory consumption because it causes repetitive playing of media which consumes more central processing unit (CPU) resources and memory.

Therefore, there is a need for a technical solution to reduce the time taken for evaluation of an interaction and the computer resource consumption by annotating a media-file of the interaction that has been recorded by a recording-player web-application, based on an evaluation-measurement, which saves repeated playback of the entire media-file, hence saves CPU and memory resources.

There is a need for a computerized method and system for reducing time taken for evaluation of an interaction by annotating a media-file of the interaction that has been recorded by a recording-player web-application, based on an evaluation-measurement.

SUMMARY

There is thus provided, in accordance with some embodiments of the present disclosure, a computerized-method for reducing time taken for evaluation of an interaction by annotating a media-file of the interaction that has been recorded by a recording-player web-application based on an evaluation-measurement.

In accordance with some embodiments of the present disclosure, the computerized-method may include: (i) receiving a request from a user to playback the media-file of the interaction by operating the media-playback service of the recording-player web-application; (ii) configuring the media-playback service to: a. operate an interaction-insights module to generate one or more point-in-time annotations of the media-file, based on one or more parameters of the evaluation-measurement; and b. send the one or more point-in-time annotations and a location of the media-file to the recording-player web-application; and (iii) configuring the recording-player web-application to playback the media-file and upon a user-selection to present each point-in-time annotation of the one or more point-in-time annotations, via a User Interface (UI) that is associated to the recording-player web-application, on a timeline-bar as an annotation-marker. Each point-in-time annotation may include a playhead position in the media-file and a text-annotation related to a parameter of the one or more parameters of the evaluation-measurement in the playhead position.

Furthermore, in accordance with some embodiments of the present disclosure, the computerized-method is checking and annotating the media-file of the interaction based on one or more evaluation-measurements.

Furthermore, in accordance with some embodiments of the present disclosure, the evaluation-measurement may be one of: (i) customer demography and identification; (ii) agent behavior analysis; (iii) interaction analytics; and (iv) interaction opening and closing. The one or more parameters of the customer demography and identification is at least one of: a. customer identity verification; b. identify information compromised; and c. customer demographic check. The one or more parameters of the agent behavior analysis is at least one of: a. empathy; b. politeness. The one or more parameters of the interaction analytics is at least one of: a. no delays; b. silence; c. long holds; and d. unnecessary holds, and the one or more parameters of the interaction opening and closing is at least one of: a. greetings at the opening of the interaction; and b. greetings at the closing of the interaction.

Furthermore, in accordance with some embodiments of the present disclosure, the user-selection is one of: first user-selection of the annotation-marker on the timeline-bar, to display the text-annotation related to the evaluation measurement on the timeline-bar, and second user-selection of all-annotation-markers, to display each text-annotation related to the evaluation measurement of the one or more point-in-time annotations on the timeline-bar.

Furthermore, in accordance with some embodiments of the present disclosure, the first user-selection and the second user-selection are operated by at least one of: (i) mouse click; (ii) keystroke; and (iii) keystroke combination.

Furthermore, in accordance with some embodiments of the present disclosure, each generated point-in-time annotation of the one or more point-in-time annotations of the media-file may be stored as an attribute of the interaction in a database.

Furthermore, in accordance with some embodiments of the present disclosure, the interaction-insights module may include: (i) retrieving a transcript of the interaction based on an interaction-identifier of the interaction. The transcript may be tokenized into one or more sentences, and each sentence in the one or more sentences may be labeled with a start-timestamp and a participant-role. (ii) constructing a multi-step prompt based on the transcript and one or more polar-questions related to appearance of the evaluation-measurement and the one or more parameters in the transcript, the participant-role, and the start-timestamp; (iii) executing Artificial Intelligence (AI) models with the multi-step prompt to yield a response, for the evaluation-measurement and the one or more parameters. The response comprising an answer to each polar-question, the participant role, and the start-timestamp and the answer is one of: affirmative and negative; for each parameter of the one or more parameters of the evaluation-measurement: (iv) when the answer is affirmative generating the text-annotation based on the participant-role, the parameter, and a start-timestamp; (v) when the answer is negative, generating the text-annotation based on the parameter and a provided start-timestamp. The start-time-stamp may be provided by a first-step in the multi-step prompt which requires to search the start-timestamp related to absence of the parameter to yield the provided start-timestamp; (vi) generating a suggestion based on answer by a second-step in the multi-step prompt and adding the suggestion to the text-annotation; and (vii) adding the point-in-time annotation. The point-in-time annotation is added with the start-timestamp as the playhead position in the media-file and the generated text-annotation.

Furthermore, in accordance with some embodiments of the present disclosure, the computerized-method may further include configuring the media-playback service to operate an extract-of-interaction module to generate an abbreviated media-file including one or more sections. Each section has a point-in-time annotation. The extract-of-interaction model may include: (i) retrieving a transcript of the interaction based on an interaction-identifier of the interaction. The transcript is tokenized into one or more sentences, and each sentence in the one or more sentences is labeled with a start-timestamp and a participant-role; (ii) executing AI models with Large Language Model (LLM) with the transcript and an excerpt-prompt to yield one or more portions of the transcript and an associated chapter-name for each portion. Each portion in the one or more portions has an associated start-timestamp and end-timestamp; (iii) cutting-out one or more segments from the media-file based on the associated start-timestamp and end-timestamp of each portion; (iv) combining the one or more segments based on the start-timestamp of each segment to yield the abbreviated media-file; and (v) creating chapters in the abbreviated media-file by marking each segment in the abbreviated media-file as a chapter and assigning the associated chapter name as a title of the chapter, and configuring the recording-player web-application to present the abbreviated media-file and the chapter name of each segment in the abbreviated media-file via the UI.

Furthermore, in accordance with some embodiments of the present disclosure, the computerized-method may further include configuring the recording-player web-application to playback the abbreviated media-file upon a first user-selection of the abbreviated media-file via the UI.

Furthermore, in accordance with some embodiments of the present disclosure, the computerized-method may further include configuring the recording-player web-application to playback the segment upon a second user-selection of the chapter-name via the UI.

Furthermore, in accordance with some embodiments of the present disclosure, the computerized-method may further include configuring the media-playback service to operate an interactive-search module to enable search in the media-file by text-questions via the recording-player web-application. The interactive-search module may include: (i) receiving a polar-query in natural language from a user via the UI that is associated to the recording-player web-application; (ii) retrieving a transcript of the interaction based on an interaction-identifier of the interaction. The transcript is tokenized into one or more sentences, and each sentence in the one or more sentences is labeled with a start-timestamp and a participant-role; (iii) constructing a search-prompt with the transcript, the polar-query in natural language and a request for one or more related start-timestamps embedded therein; and (iv) executing AI models with LLM with the search-prompt to yield a response and the one or more related start-timestamps. When the response is affirmative, configuring the recording-player web-application to present an annotation-marker in each start-timestamp of the one or more related start-timestamps, via the UI that is associated to the recording-player web-application, on a timeline-bar, and when the response is negative, configuring the recording-player web-application to present the response via the UI that is associated to the recording-player web-application.

There is further provided, in accordance with some embodiments of the present invention, a computerized-system for reducing time taken for evaluation of an interaction by annotating a media-file of an interaction that has been recorded by a recording-player web-application based on an evaluation-measurement.

Furthermore, in accordance with some embodiments of the present disclosure, the computerized-system includes one or more processors. The one or more processors may be configured to (i) receive a request from a user to playback the media-file of the interaction by operating the media-playback service of the recording-player web-application; (ii) configure the media-playback service to: a. operate an interaction-insights module to generate one or more point-in-time annotations of the media-file, based on one or more parameters of the evaluation-measurement; and b. send the one or more point-in-time annotations and a location of the media-file to the recording-player web-application; and (iii) configure the recording-player web-application to playback the media-file and upon a user-selection to present each point-in-time annotation of the one or more point-in-time annotations, via a User Interface (UI) that is associated to the recording-player web-application, on a timeline-bar as an annotation-marker. Each point-in-time annotation may include a playhead position in the media-file and a text-annotation related to a parameter of the one or more parameters of the evaluation-measurement.

Furthermore, in accordance with some embodiments of the present disclosure, the one or more processors may be configured to check and annotate the media-file of the interaction based on one or more evaluation-measurements.

Furthermore, in accordance with some embodiments of the present disclosure, the evaluation-measurement may be one of: (i) customer demography and identification; (ii) agent behavior analysis; (iii) interaction analytics; and (iv) interaction opening and closing. The one or more parameters of the customer demography and identification is at least one of: a. customer identity verification; b. identify information compromised; and c. customer demographic check. The one or more parameters of the agent behavior analysis is at least one of: a. empathy; b. politeness. The one or more parameters of the interaction analytics is at least one of: a. no delays; b. silence; c. long holds; and d. unnecessary holds, and the one or more parameters of the interaction opening and closing is at least one of: a. greetings at the opening of the interaction; and b. greetings at the closing of the interaction.

Furthermore, in accordance with some embodiments of the present disclosure, the user-selection may be one of: first user-selection of the annotation-marker on the timeline-bar, to display the text-annotation related to the evaluation measurement on the timeline-bar, and second user-selection of all-annotation-markers, to display each text-annotation related to the evaluation measurement of the one or more point-in-time annotations on the timeline-bar.

Furthermore, in accordance with some embodiments of the present disclosure, the first user-selection and the second user-selection are operated by at least one of: (i) mouse click; (ii) keystroke; and (iii) keystroke combination.

Furthermore, in accordance with some embodiments of the present disclosure, each generated point-in-time annotation of the one or more point-in-time annotations of the media-file may be stored as an attribute of the interaction in a database.

Furthermore, in accordance with some embodiments of the present disclosure, the interaction-insights module may include: (i) retrieving a transcript of the interaction based on an interaction-identifier of the interaction. The transcript may be tokenized into one or more sentences, and each sentence in the one or more sentences may be labeled with a start-timestamp and a participant-role. (ii) constructing a multi-step prompt based on the transcript and one or more polar-questions related to appearance of the parameter in the transcript, the participant-role, and the start-timestamp; (iii) executing Artificial Intelligence (AI) models with the multi-step prompt to yield a response, for the evaluation-measurement and the one or more parameters. The response comprising an answer to each polar-question, the participant-role, and the start-timestamp. The response comprising an answer to each polar-question, the participant-role and the start-timestamp. The answer is one of: affirmative and negative; For each parameter of the one or more parameters of the evaluation-measurement: (iv) when the answer is affirmative generating the text-annotation based on the participant-role and the parameter, and a start-timestamp; (v) when the answer is negative, generating the text-annotation based on the parameter and a provided start-timestamp. The start-timestamp may be provided by a first-step in the multi-step prompt which requires to search the start-timestamp related to absence of the parameter to yield the provided start-timestamp. (vi) generating a suggestion based on the answer by a second-step in the multi-step prompt and adding the suggestion to the text-annotation; and (vii) adding the point-in-time annotation. The point-in-time annotation is added with the start-timestamp as the playhead position in the media-file and the generated text-annotation.

Furthermore, in accordance with some embodiments of the present disclosure, the one or more processors may be further configured to configure the media-playback service to operate an extract-of-interaction module to generate an abbreviated media-file including one or more sections. Each section has a point-in-time annotation. The extract-of-interaction model may include: (i) retrieving a transcript of the interaction based on an interaction-identifier of the interaction. The transcript is tokenized into one or more sentences, and each sentence in the one or more sentences is labeled with a start-timestamp and a participant-role; (ii) executing AI models with Large Language Model (LLM) with the transcript and an excerpt-prompt to yield one or more portions of the transcript and an associated chapter-name for each portion. Each portion in the one or more portions has an associated start-timestamp and end-timestamp; (iii) cutting-out one or more segments from the media-file based on the associated start-timestamp and end-timestamp of each portion; (iv) combining the one or more segments based on the start-timestamp of each segment to yield the abbreviated media-file; and (v) creating chapters in the abbreviated media-file by marking each segment in the abbreviated media-file as a chapter and assigning the associated chapter name as a title of the chapter, and configure the recording-player web-application to present the abbreviated media-file and the chapter-name of each segment in the abbreviated media-file via the UI.

Furthermore, in accordance with some embodiments of the present disclosure, the one or more processors may be further configured to configuring the recording-player web-application to playback the abbreviated media-file upon a first user-selection of the abbreviated media-file via the UI.

Furthermore, in accordance with some embodiments of the present disclosure, the one or more processors may be further configured to configuring the recording-player web-application to playback the segment upon a second user-selection of the chapter-name via the UI.

Furthermore, in accordance with some embodiments of the present disclosure, the one or more processors may be further configured to configure the media-playback service to operate an interactive-search module to enable search in the media-file by text-questions via the recording-player web-application. The interactive-search module may include: (i) receiving a polar-query in natural language from a user via the UI that is associated to the recording-player web-application; (ii) retrieving a transcript of the interaction based on an interaction-identifier of the interaction. The transcript is tokenized into one or more sentences, and each sentence in the one or more sentences is labeled with a start-timestamp and a participant-role; (iii) constructing a search-prompt with the transcript, the polar-query in natural language and a request for one or more related start-timestamps embedded therein; and (iv) executing AI models with LLM with the search-prompt to yield a response and the one or more related start-timestamps. When the response is affirmative, configuring the recording-player web-application to present an annotation-marker in each start-timestamp of the one or more related start-timestamps, via the UI that is associated to the recording-player web-application, on a timeline-bar, and when the response is negative, configuring the recording-player web-application to present the response via the UI that is associated to the recording-player web-application.

BRIEF DESCRIPTION OF THE DRAWINGS

In order for the present invention, to be better understood and for its practical applications to be appreciated, the following Figures are provided and referenced hereafter. It should be noted that the Figures are given as examples only and in no way limit the scope of the invention. Like components are denoted by like reference numerals.

FIG. 8 is an example of a prompt for customer demographic checks, in accordance with some embodiments of the present invention;

FIG. 9 is an example of a prompt for agent behavior as to empathy check, in accordance with some embodiments of the present invention;

FIG. 18 is an example of a transcript that is tokenized into sentences, and each sentence is labeled with a start-time-stamp and a participant-role, in accordance with some embodiments of the present invention;

FIG. 19 is an example of chapters names of an abbreviated media-file, in accordance with some embodiments of the present invention.

DETAILED DESCRIPTION

Figure 1A:
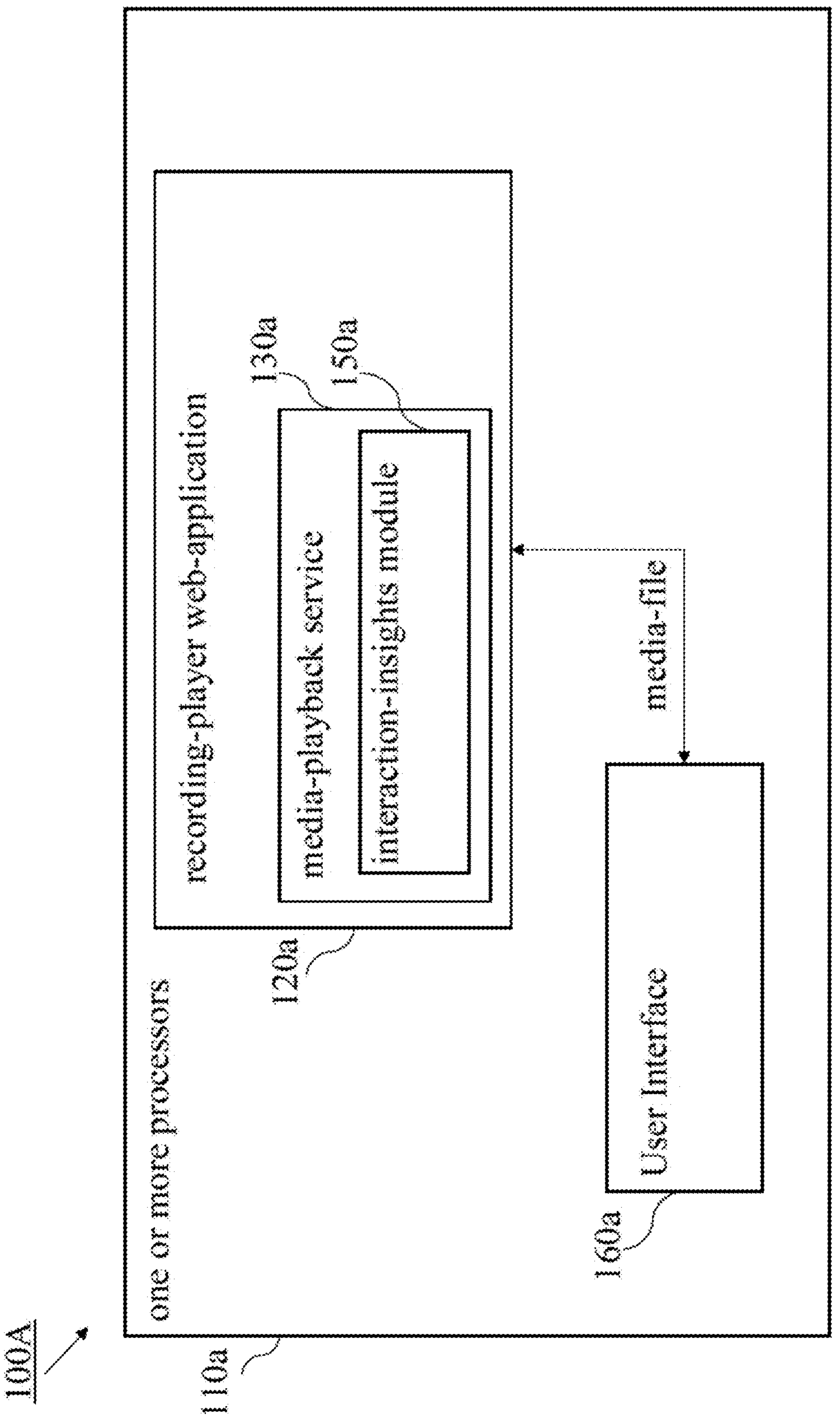
FIGS. 1A-1C schematically illustrate a high-level diagram of a computerized system for reducing time taken for evaluation of an interaction by annotating a media-file of the interaction that has been recorded by a recording-player web-application based on an evaluation-measurement, in accordance with some embodiments of the present invention.

In the following detailed description, numerous specific details are set forth in order to provide a thorough understanding of the disclosure. However, it will be understood by those of ordinary skill in the art that the disclosure may be practiced without these specific details. In other instances, well-known methods, procedures, components, modules, units and/or circuits have not been described in detail so as not to obscure the disclosure.

Although embodiments of the disclosure are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium (e.g., a memory) that may store instructions to perform operations and/or processes.

Although embodiments of the disclosure are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to an order or sequence. Additionally, some of the described method embodiments or elements thereof can occur or be performed simultaneously, at the same point in time, or concurrently. Unless otherwise indicated, use of the conjunction "or" as used herein is to be understood as inclusive (any or all of the stated options).

In current contact centers, during interactions evaluation, evaluators have to listen to the entire call-recording to read the entire text of a digital text interaction to find answers to various questions, such as "did the agent try to upsell another profitable product?" or "did the agent read out a mandatory taxation clause for compliance purpose". During this process of interactions evaluation there is an increased computer resource consumption by the evaluators due to toggling of the 'pause' feature of the recording-player web-application, on and off.

Therefore, there is a need for a technical solution to automatically find absence of greetings and absence of customer demographic checks by the agent in the call-recordings. There is further a need for a technical solution for a short preview of the call-recording that is focusing on areas that require the attention of the evaluator which may reduce the time and computer-resources taken without it.

There is a need for a system and method for reducing time taken for evaluation of an interaction by annotating a media-file of the interaction that has been recorded by a recording-player web-application based on an evaluation-measurement.

FIG. 1A schematically illustrate a high-level diagram of a computerized system 100A for reducing time taken for evaluation of an interaction by annotating a media-file of the interaction that has been recorded by a recording-player web-application based on an evaluation-measurement, in accordance with some embodiments of the present invention.

Figure 2:
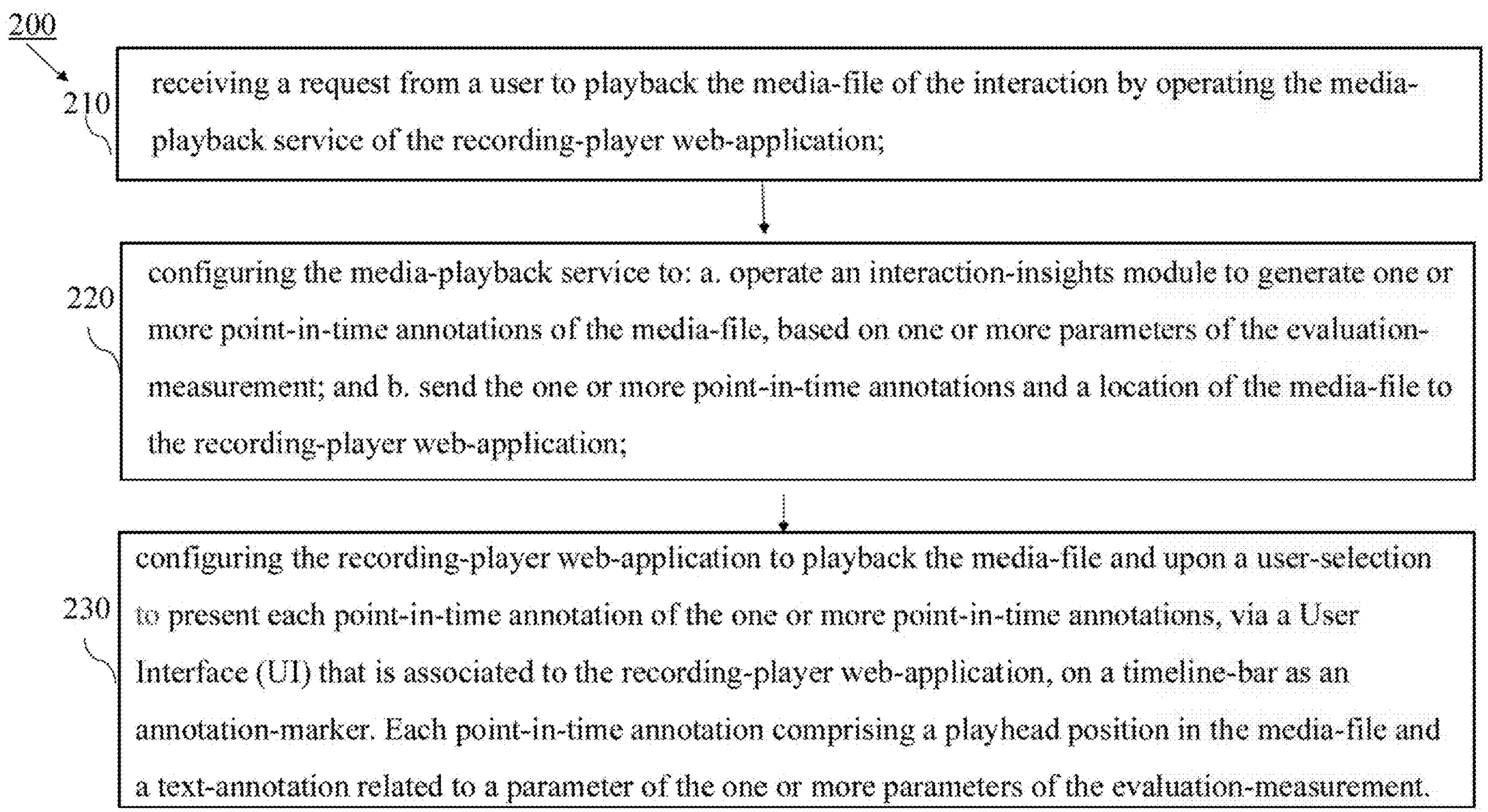
FIG. 2 is a schematic workflow of a computerized-method for reducing time taken for evaluation of an interaction by annotating a media-file of the interaction that has been recorded by a recording-player web-application based on an evaluation-measurement, in accordance with some embodiments of the present invention.

According to some embodiments of the present disclosure, a system, such as system 100A may implement a computerized-method, such as computerized-method 200 in FIG. 2 for reducing time taken for evaluation of an interaction by annotating a media-file of the interaction that has been recorded by a recording-player web-application, based on an evaluation-measurement.

According to some embodiments of the present disclosure, interactions between agents and customers in a contact center are monitored, recorded, and stored as a media-file for later on evaluation purposes. The media-file may include an audio-file of a recording of the call or recording of the audio and video of the screen of the agent desktop during the interaction. The media-file may be recording of the screen of the agent and text of a digital text interaction.

According to some embodiments of the present disclosure, one or more processors 110*a* may be configured to receive a request from a user to playback the media-file of the interaction by operating a service, such as media-playback service 130*a* of the recording-player web-application 120*a*.

According to some embodiments of the present disclosure, the one or more processors 110*a* may be configured to operate a module, such as interaction-insights module 150*a* to generate one or more point-in-time annotations of the media-file, for example, as shown in FIGS. 11-14, based on parameters of the evaluation-measurement.

According to some embodiments of the present disclosure, for example, the evaluation-measurement may be customer demography and identification and the related parameters may be at least one of: customer identity verification, identify information compromised, and customer demographic check. The multi-step prompt may be for example, as shown in FIG. 8.

According to some embodiments of the present disclosure, for example, the evaluation-measurement may be agent behavior analysis and the related parameters may be at least one of: empathy and politeness.

Figure 10:
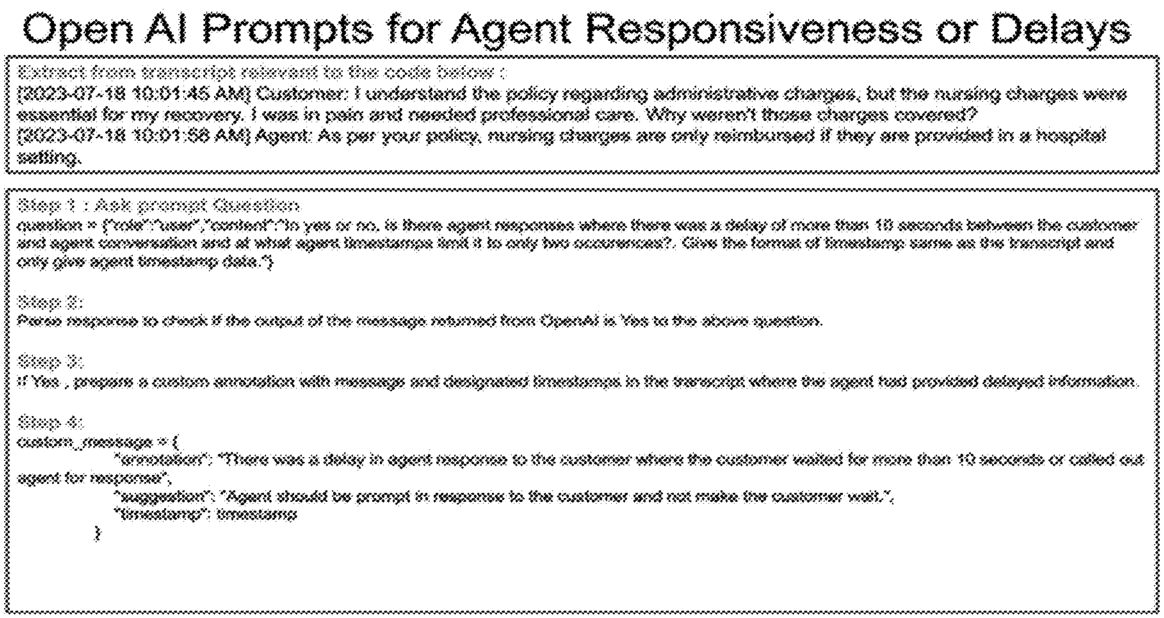
FIG. 10 is an example of a prompt for agent responsiveness or delays check, in accordance with some embodiments of the present invention.

According to some embodiments of the present disclosure, for example, the evaluation-measurement may be interaction analytics and the related parameters may be at least one of: no delays, silence, long holds, and unnecessary holds. The multi-step prompt may be for example, as shown in FIG. 10.

According to some embodiments of the present disclosure, for example, a multi-step prompt for agent delays may be as follows:

"Answer the following questions:

Question 1: Is the agent taking long time to reply to the customer?

Question 2: Is the customer getting frustrated due to delayed responses from the agent?your answer should be in the form of Yes or No and also provide examples from the transcript along with the relevant timestamp where the agent was taking more time."

According to some embodiments of the present disclosure, the response may be as follows;

Question 1: Yes

Example:

Timestamp 2023-07-18 10:25 AM: The customer asks, "Hello, are you there?" indicating that the agent has taken a significant amount of time to respond.

Timestamp 2023-07-18 10:45 AM: The customer again prompts, "Hello? Are you still there?" suggesting another delay in the agent's response.

Question 2: Yes

Example:

Timestamp 2023-07-18 10:30 AM: The customer asks, "Hello, are you there?" indicating frustration due to the delay in response.

Timestamp 2023-07-18 10:50 AM: The customer again prompts, "Hello? Are you still there?" showing increasing frustration with the agent's slow responses.

Annotation formed from the answer:

Time, Annotation text

[2023-07-18 10:25 AM], The agent took very long to respond to the customer. this is not a good customer experience and creates a negative brand perception in the mind of the customer.

[2023-07-18 10:45 AM], The agent took very long to respond to the customer. this is not a good customer experience and creates a negative brand perception in the mind of the customer.

[2023-07-18 10:30 AM], The customer is angry and frustrated due to the long delay in response from the agent.

[2023-07-18 10:50 AM], The customer is angry and frustrated due to the long delay in response from the agent."

According to some embodiments of the present disclosure, for example, the evaluation-measurement interaction may be opening and closing of the interaction and the related parameters may be at least one of: greetings at the opening of the interaction; and greetings at the closing of the interaction. For example, the multi-step prompt may be as follows:

"Answer the following questions:

Question 1: Did the agent greet the customer at the start of the interaction?

Question 2: Did the agent greet the customer at the end of the interaction?

Question 3: Did the agent thanks the customer for calling the contact center and wish a good day ahead?

your answer should be per question and the answer should include Yes or No and along with that provide the timestamps from the transcript where the agent did the needful."

According to some embodiments of the present disclosure, the response may be as follows:

Question 1: No

Question 2: Yes

Example:

Timestamp 2023-07-18 10:55 AM: The agent says, "Goodbye. Have a great day." This indicates that the agent greeted the customer at the end of the interaction.

Question 3: Yes

Example:

Timestamp 2023-07-18 10:50 AM: The agent says, "You're welcome. I'll be in touch soon. Take care and have a good day." This indicates that the agent thanked the customer for calling the contact center and wished him a good day ahead.

Annotation formed from the answer:

Time, Annotation text

[2023-07-18 10:55 AM], The agent did not greet the customer during the opening of the call. This is not professional on the part of the agent.

[2023-07-18 10:50 AM], The agent greeted the customer during the closure of the call and thanked the customer for calling."

According to some embodiments of the present disclosure, the checking and annotating of the media-file of the interaction may be based on a plurality of evaluation-measurements.

According to some embodiments of the present disclosure, the one or more processors 110*a* may be configured to send the one or more point-in-time annotations as metadata of the interaction and a location of the media-file, e.g., media-file Uniform Resource Locator (URL), to the recording-player web-application 120*a*.

According to some embodiments of the present disclosure, the one or more processors 110*a* may be configured to configure the recording-player web-application 120*a* to playback the media-file and upon a user-selection to present each point-in-time annotation of the point-in-time annotations, as a text-annotation, for example, as shown in FIGS. 11-14, via a User Interface (UI) 160*a* that is associated to the recording-player web-application 120*a*, on a timeline-bar as an annotation-marker.

According to some embodiments of the present disclosure, each point-in-time annotation may include a playhead position in the media-file and a text-annotation related to a parameter of the parameters that are related to the evaluation-measurement.

According to some embodiments of the present disclosure, the user-selection is one of: first user-selection of the annotation-marker on the timeline-bar, to display the text-annotation related to the evaluation measurement on the timeline-bar, and second user-selection of all-annotation-markers, to display each text-annotation related to the evaluation measurement of the one or more point-in-time annotations on the timeline-bar.

According to some embodiments of the present disclosure, the user-selection may be operated by at least one of: (i) mouse click; (ii) keystroke; and (iii) keystroke combination.

According to some embodiments of the present disclosure, each generated point-in-time annotation of the point-in-time annotations of the media-file may be stored as an attribute of the interaction, e.g., as metadata of the interaction, in a database (not shown).

According to some embodiments of the present disclosure, the interaction-insights module 150*a* may include retrieving a transcript of the interaction based on an interaction-identifier of the interaction. The transcript may be tokenized into one or more sentences, and each sentence in the one or more sentences may be labeled with a start-timestamp and a participant-role, for example, as shown in FIG. 18.

According to some embodiments of the present disclosure, when a user may request to playback an interaction, via the UI 160*a* of the recording-player web-application 120*a* the recording-player web-application 120*a* may operate the media-playback service 130*a* to call the interaction-insights module 150*a*. The interaction-insights module 150*a* may generate point-in-time annotations based on AI models execution with a multi-step prompt having the transcript and polar-questions related to appearance of the evaluation-measurement and the parameters in the transcript, the participant-role, and the start-timestamp embedded therein.

According to some embodiments of the present disclosure, the interaction-insights module 150*a* may be further constructing a multi-step prompt based on the transcript and polar-questions related to appearance of the evaluation-measurement and the parameters in the transcript, the participant-role, and the start-timestamp. Then, executing Artificial Intelligence (AI) models with the multi-step prompt to yield a response, for the evaluation-measurement and the parameters. The response may include an answer to each polar-question, the participant-role and the start-timestamp. The answer is one of: affirmative and negative, which means that it is either yes or no.

According to some embodiments of the present disclosure, for example, when the polar-question is related to an evaluation measurement, such as demographic question or customer identity, then the yielded response by the executing of the first-prompt may be "Yes the agent asked the customer about their demographic information". The response of the execution of a second-prompt based on the transcript and a question to search the start-timestamp related to appearance of the parameters may be "phone number inquiry: Yes, the agent asked for the phone number at the timestamp [2023-07-14 10:01:05 AM]. The customer's phone number is 8006543215.". address inquiry: Yes, the agent asked for the address at the timestamp [2023-07-14 10:00:34 AM]. The customer's address is 2514 W 21st Street, Hanford, CA 93230.". In yet another example, when the polar-question is related to date of birth, the yielded response may be "No, the agent did not ask for the date of birth of the customer." The timestamp provided in the response may be used for the point-in-time annotations of the media-file.

According to some embodiments of the present disclosure, when the answer is affirmative the text-annotation may be generated based on the participant-role, the parameter, and a start-timestamp.

According to some embodiments of the present disclosure, when the answer is negative, the text-annotation may be generated based on the parameter and a provided start-timestamp. The start-timestamp may be provided by a first-step in the multi-step prompt which requires to search the start-timestamp related to absence of the parameter to yield the provided start-timestamp.

According to some embodiments of the present disclosure, a suggestion may be generated based on the answer by a second-step in the multi-step prompt and may be added to the text-annotation.

According to some embodiments of the present disclosure, the point-in-time annotation may be added with the start-timestamp as the playhead position in the media-file and the generated text-annotation.

Figure 11:
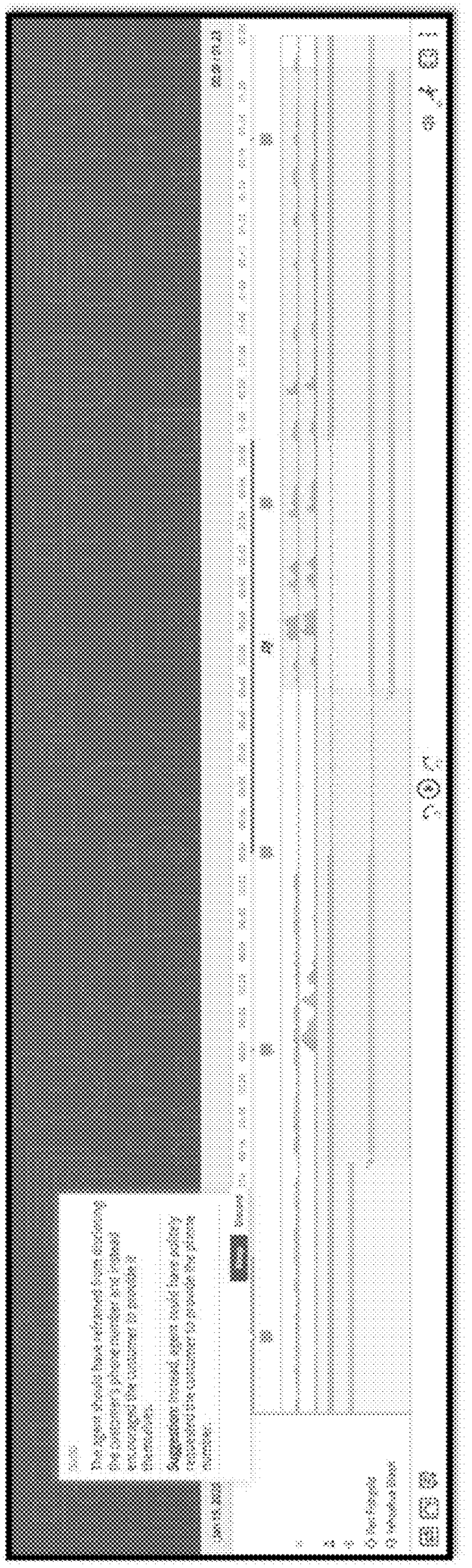
FIG. 11 is an example of a point-in-time annotation as customer demographic check on a timeline-bar as an annotation-marker and a suggestion, in accordance with some embodiments of the present invention.
Figure 12:
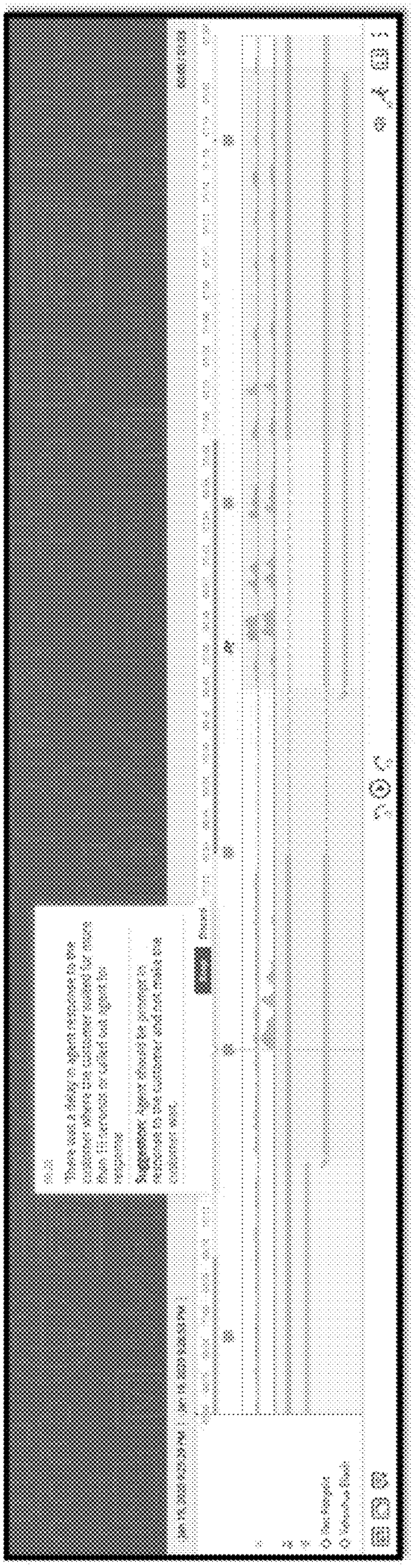
FIG. 12 is an example of a point-in-time annotation as to agent responsiveness on a timeline-bar as an annotation-marker and a suggestion, in accordance with some embodiments of the present invention.
Figure 13:
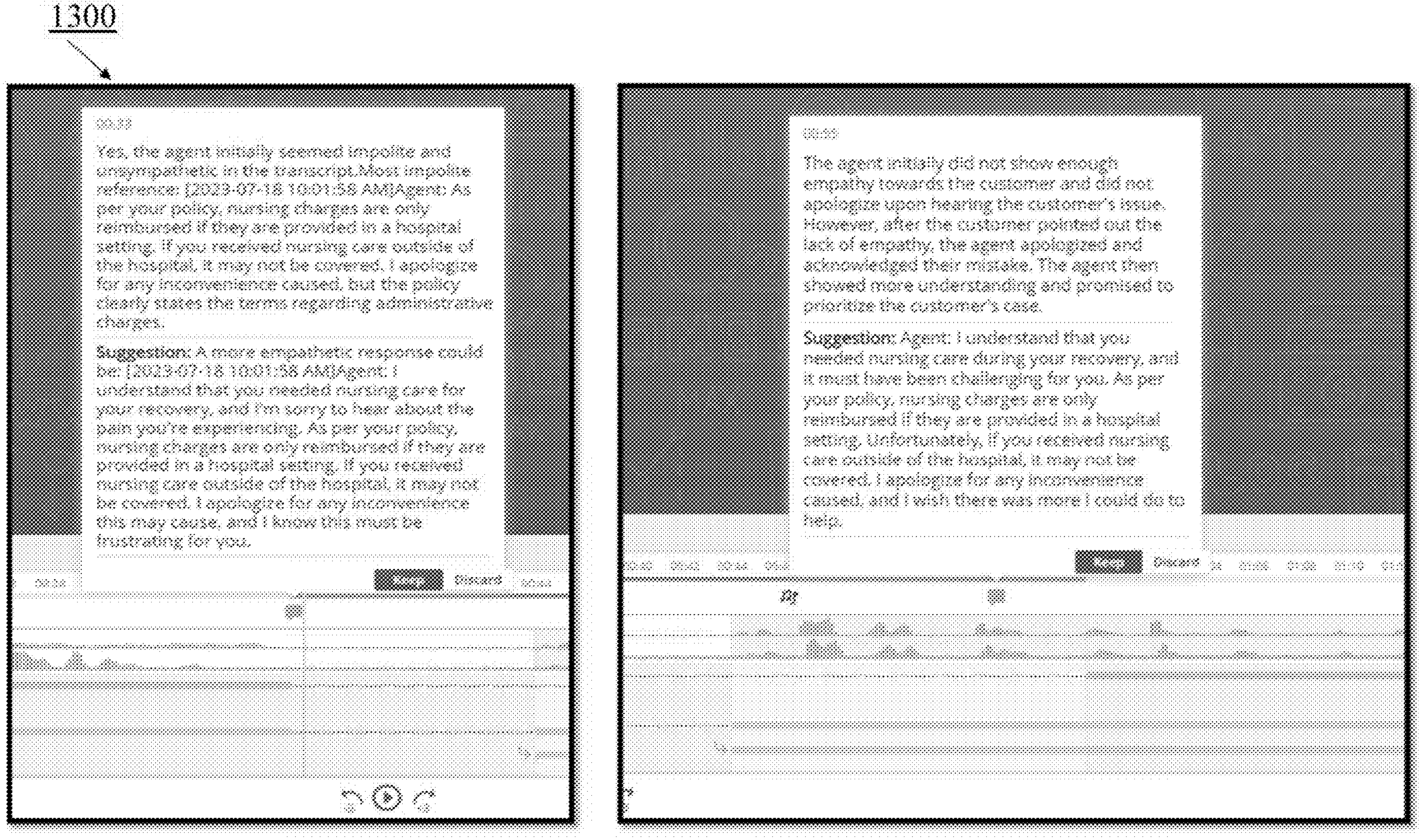
FIG. 13 is an example of point-in-time annotation on a timeline-bar as an annotation-marker and related suggestions, in accordance with some embodiments of the present invention.
Figure 14:
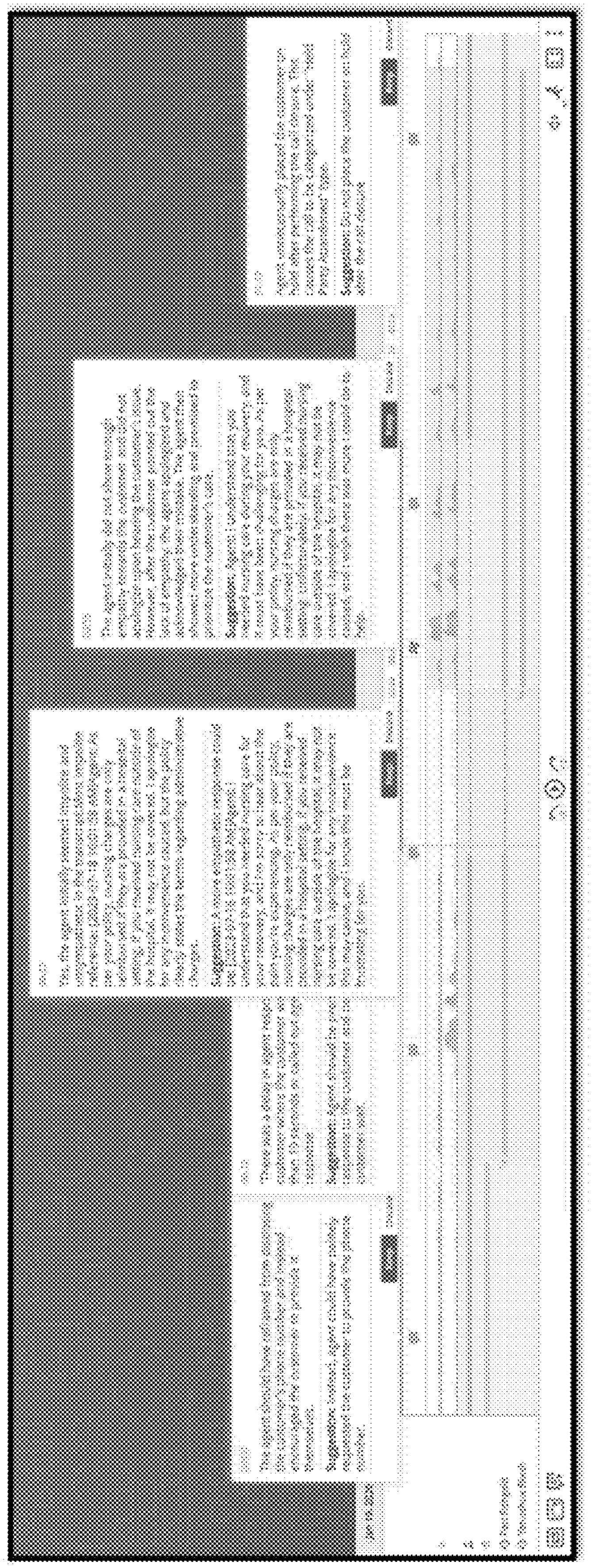
FIG. 14 is an example of point-in-time annotations viewed simultaneously on a timeline-bar as an annotation-marker and related suggestions, in accordance with some embodiments of the present invention.

According to some embodiments of the present disclosure, upon a user-selection on the annotation markers on the timeline bar to see the text-annotation, for example as shown in FIGS. 11-13. The user may be presented via the UI 160*a* to see all the text-annotations, as shown in FIG. 14.

According to some embodiments of the present disclosure, the user may be enabled to keep or discard each text-annotation via the UI 160*a*. When the user may click on a keep button, the text-annotation may be saved to the metadata of the interaction and may be available for a request of playback of the media-file of the interaction.

Figure 1B:
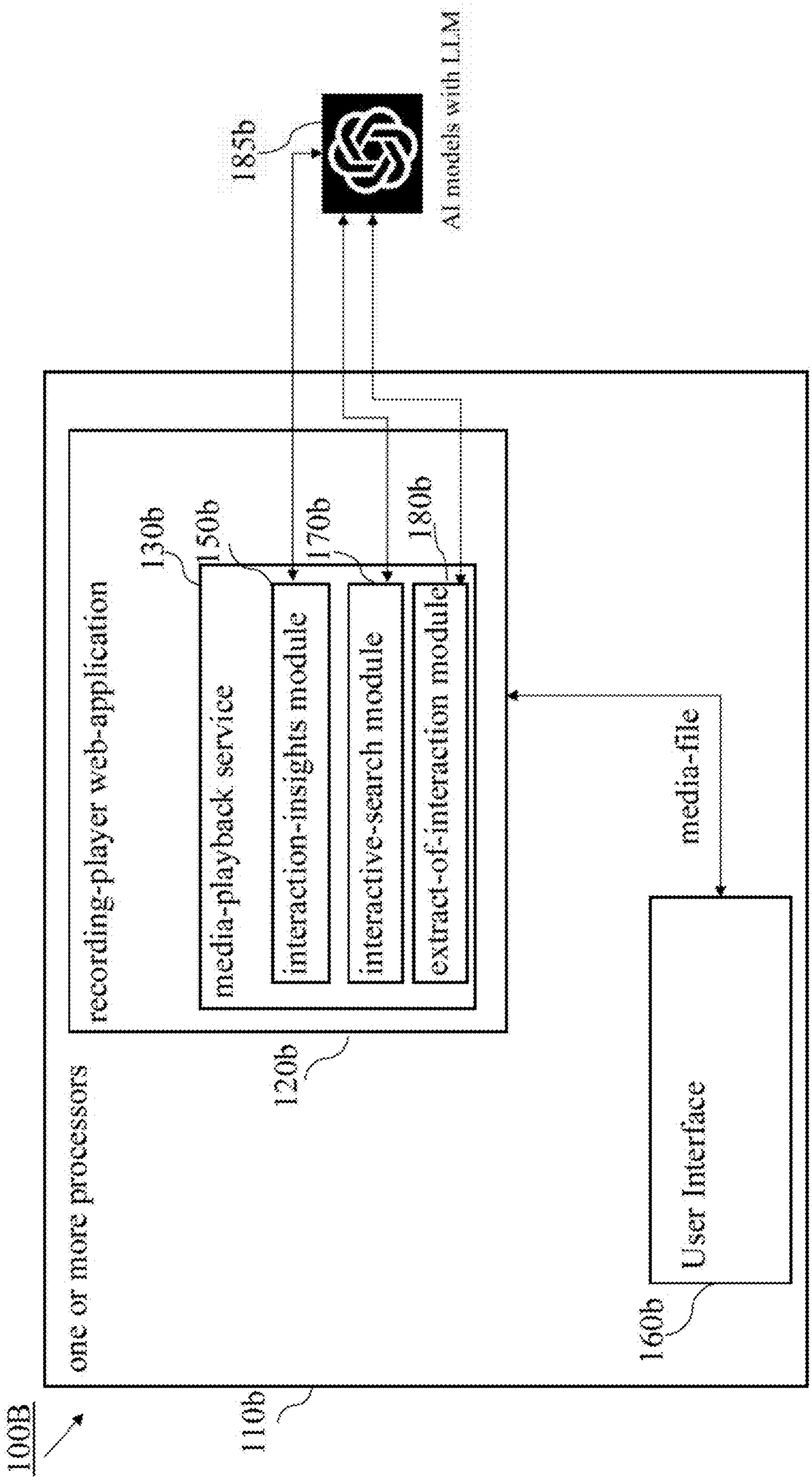

FIG. 1B schematically illustrate a high-level diagram of a computerized system 100B for reducing time taken for evaluation of an interaction by annotating a media-file of the interaction that has been recorded by a recording-player web-application based on an evaluation-measurement, in accordance with some embodiments of the present invention.

According to some embodiments of the present disclosure, system 100B may include similar components as system 100A in FIG. 1A for evaluation of an interaction by annotating a media-file of the interaction that has been recorded by a recording-player web-application based on an evaluation-measurement.

According to some embodiments of the present disclosure, system 100B may automatically identify parameters of an evaluation-measurement, such as lack of greetings or demographic checks by operating the interaction-insights module 150*b*, such as interaction-insights module 150*a* in FIG. 1A to generate point-in-time annotations of the media-file, based on parameters of the evaluation-measurement. The generated point-in-time annotations of the media-file may save repeated playback of the entire media-file for the checks which are specified in the multi-step prompt, hence saves CPU and memory resources.

According to some embodiments of the present disclosure, the media-playback service 130*b* may be configured to operate an extract-of-interaction module 180*b* to generate an abbreviated media-file that may include sections, and in each section a point-in-time annotation. The sections may be for example, chapters, such as 'welcome message and language selection', reason for call, resolution offered and escalation, as shown in FIG. 19.

According to some embodiments of the present disclosure, upon a request of a user to playback the media-file that is related to an interaction having an associated contactID, via the UI 160*b* that is associated to the recording-player web-application 120*b*, the media-playback service 130*b* may operate the extract-of-interaction module 180*b* to generate an abbreviated media-file and chapters in the media-file of the interaction, as shown in FIG. 19. The abbreviated media-file and chapters in the media-file of the interaction may be generated by executing AI models with LLM 185*b* and excerpt-prompt to yield portions of the transcript and an associated chapter-name for each portion. The generated abbreviated media-file may save repeated playback of the entire media-file, hence saves CPU and memory resources.

According to some embodiments of the present disclosure, the portions e.g., chapters may be determined by guiding the verbal multi-step prompt, with hints, for example, such as to reason of the call, the resolution offered by the agent, customers reaction to the solution provided, escalations, customer sentiment degradation, actions taken by agent that conducted the interaction and next steps agreed by the agent. A limitation to the number of chapters may be defined in the verbal multi-step prompt, for example up to 10 chapters for a media-file of 10 minutes length or less and up to 15 chapters to a media-file of more than 15 minutes length.

According to some embodiments of the present disclosure, segments from the media-file may be cut-out based on the associated start-timestamp and end-timestamp of each portion. The segments may be combined based on the start-timestamp of each segment to yield the abbreviated media-file.

According to some embodiments of the present disclosure, chapters in the abbreviated media-file may be created by marking each segment in the abbreviated media-file as a chapter and assigning the associated chapter name as a title of the chapter.

Figure 15:
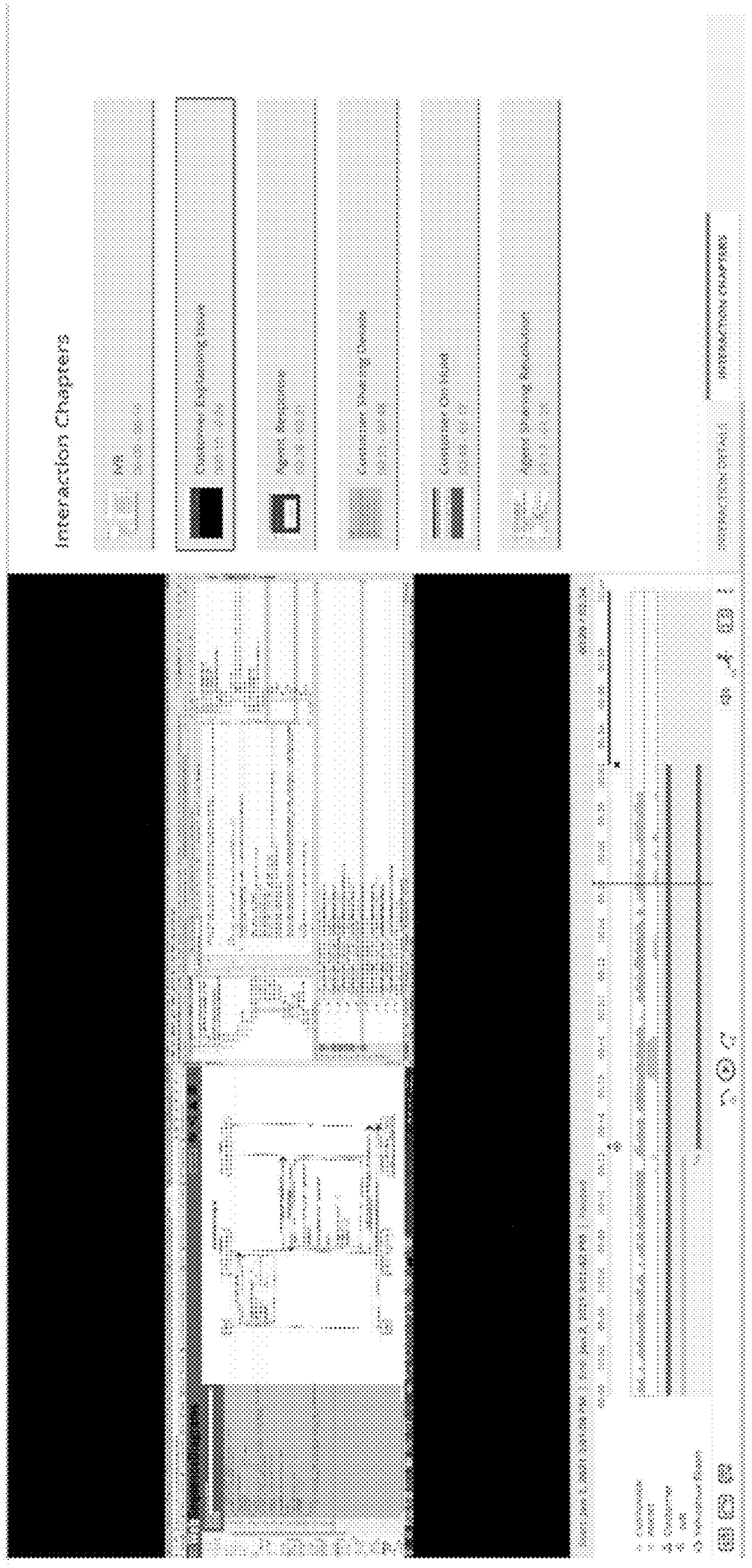
FIG. 15 is an example of a screenshot of chapter generator, in accordance with some embodiments of the present invention.

According to some embodiments of the present disclosure, the media-playback service 130*b* may return the abbreviated media-file and the chapters information, e.g., chapter name and start-timestamp and end-timestamp to the recording-player web-application 120*b*. When the UI 160*b* of the recording-player web-application 120*b* may be populated with the abbreviated media-file and the chapters information, a chapter navigation bar may be created, for example, as shown in FIG. 15.

According to some embodiments of the present disclosure, the chapters in the abbreviated media-file may be presented to the user via the UI 160*b* via the chapter navigation bar and the user may select a chapter by the associated chapter name. Each chapter may be a clickable menu option and upon a user selection the recording-player web-application may start playing the relevant portion of the media-file that has been mapped to that chapter.

According to some embodiments of the present disclosure, the user may click on the chapter's name to navigate with the media-file to go to the associated chapter in the media-file and listen to it. Thus, the user may focus on parts of the interaction in a guided manner. Also, the position of parts of the interaction may be identified within the time range of the interaction without listening to the full media-file of the interaction and toggling in parts of the media-file that are of no interest to the user. Thus, reducing the time that is required for the evaluation of the interaction and the computer resources consumed when the full interaction recording is provided by enabling an effective navigation options between chapters.

According to some embodiments of the present disclosure, for example the multi-step prompt may be, "Answer the following questions:

divide the call transcript into multiple chapters where each chapter will have a specific start and end time and there will be no time overlap between chapters. The chapters should not be more than 15 but if the call is short then it can be up to 10 chapters. Chapters should have concise title made of 2 to 3 words. Chapters should try to divide the call such that one can locate the different sections of interest like reason for the call, solution provided by agent, customer reaction to solution, escalation. The identified chapters should always contain following chapters call opening at the start of call, customer identification section, call closing. The customer identification chapter should be removed if the agent did not check the identity of the customer before providing information."

According to some embodiments of the present disclosure, the response to the multi-step prompt may be as follows:

"Call Opening (Start Time: 2023-07-18 10:00 AM-End Time: 2023-07-18 10:03 AM)

Issue Explanation (Start Time: 2023-07-18 10:03 AM-End Time: 2023-07-18 10:15 AM)

Policy Clarification (Start Time: 2023-07-18 10:15 AM-End Time: 2023-07-18 10:30 AM)

Customer Frustration (Start Time: 2023-07-18 10:30 AM-End Time: 2023-07-18 10:40 AM)

Agent Empathy (Start Time: 2023-07-18 10:40 AM-End Time: 2023-07-18 10:45 AM)

Solution Discussion (Start Time: 2023-07-18 10:45 AM-End Time: 2023-07-18 11:00 AM)

Customer Acceptance (Start Time: 2023-07-18 11:00 AM-End Time: 2023-07-18 11:05 AM)

Follow-up Promise (Start Time: 2023-07-18 11:05 AM-End Time: 2023-07-18 11:15 AM)

Call Closing (Start Time: 2023-07-18 11:15 AM-End Time: 2023-07-18 11:20 AM)"

According to some embodiments of the present disclosure, a text-annotation related to a parameter of an evaluation measurement may be presented via a text-annotation in the playhead position, via the UI 160*b* that is associated to the recording-player web-application 120*b*, on a timeline-bar.

According to some embodiments of the present disclosure, the extract-of-interaction module 180*b* may include retrieving a transcript of the interaction based on an interaction-identifier of the interaction. The transcript may be tokenized into sentences, and each sentence in the sentences may be labeled with a start-timestamp and a participant-role, for example, as shown in FIG. 18. The extract-of-interaction module 180*b* may further include executing AI models with Large Language Model (LLM) 185*b* with the transcript and an excerpt-prompt to yield portions of the transcript and an associated chapter-name for each portion.

According to some embodiments of the present disclosure, each portion in the portions has an associated start-timestamp and end-timestamp. Then, segments may be cut-out from the media-file based on the associated start-timestamp and end-timestamp of each portion and may be combined based on the start-timestamp of each segment to yield the abbreviated media-file.

According to some embodiments of the present disclosure, the extract-of-interaction module 180*b* may further include creating chapters in the abbreviated media-file by marking each segment in the abbreviated media-file as a chapter and assigning the associated chapter name as a title of the chapter. each chapter may be a section in the abbreviated media-file and each section may have a point-in-time annotation which is the assigned chapter name.

According to some embodiments of the present disclosure, optionally, the recording-player web-application 120*b* may be configured to playback the generated abbreviated media-file upon a user-selection of the abbreviated media-file via the UI 160*b*. Optionally, the recording-player web-application 120*b* may be configured to playback a chapter in the abbreviated media-file upon a user-selection from a list of chapters, as shown in FIG. 15.

Figure 17:
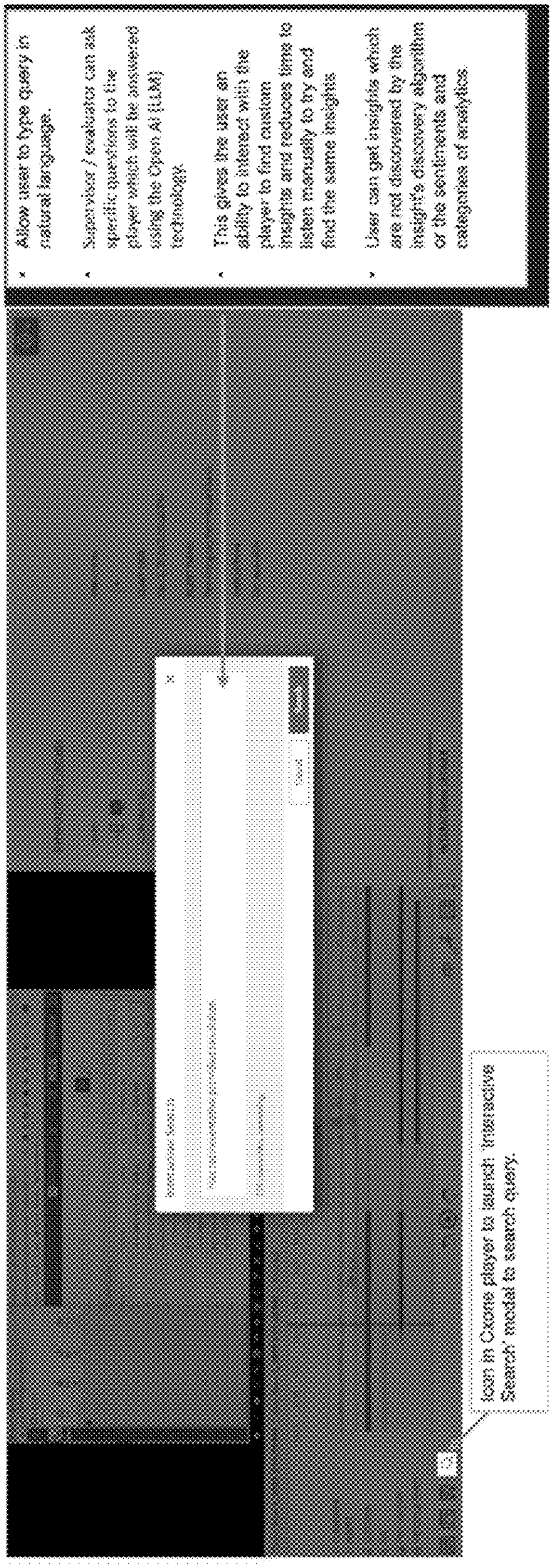
FIG. 17 is an example of a screenshot to enable an interactive-search in the media-file, in accordance with some embodiments of the present invention.

According to some embodiments of the present disclosure, the media-playback service 130*b* may operate an interactive-search module 170*b* to enable search in the media-file by text-questions via the recording-player web-application 120*b*. For example, as shown in FIG. 17.

According to some embodiments of the present disclosure, the interactive-search module 170*b* may include receiving a polar-query in natural language, e.g., text-question from a user via the UI 160*b* that is associated to the recording-player web-application 120*b* and then retrieving a transcript of the interaction based on an interaction-identifier of the interaction. The transcript may be tokenized into one or more sentences, and each sentence in the sentences may be labeled with a start-timestamp and a participant-role, as shown in FIG. 18.

According to some embodiments of the present disclosure, the interactive-search module 170*b* may further include constructing a search-prompt with the transcript, the polar-query in natural language and a request for one or more related start-timestamps, embedded therein, and then executing AI models with LLM 185*b* with the search-prompt to yield a response and the related start-timestamps. The interactive-search module 170*b* which enables search in the media-file may mark the media-file in all locations e.g., start-timestamp thus, save repeated playback of the entire media-file for the search, hence saves CPU and memory resources.

According to some embodiments of the present disclosure, for example, when a user may enter a text-question in natural language "has representative provided resolution?", the search-prompt may be {"role": "user", "content":" Has representative provided any troubleshooting steps? If yes, provide offset with hour and date for the same in the given transcript.}

According to some embodiments of the present disclosure, by the operation of the interactive-search module 170*b* by the media-playback service 130*b* the user may enter questions via the UI 160*b* of the recording-player web-application 120*b* and receive a response. the user may get insights as to the interaction which were not identified by the interaction-insights module 150*b*.

According to some embodiments of the present disclosure, the option to enter questions may be enabled by an interactive search icon in the UI 160*b* of the recording-player web-application 120*b*, that upon user-selection may provide a text box for the natural language question. The UI 160*b* may forward the question to the media-playback service 130*b* which may operate the interactive-search module 170*b* with the question.

According to some embodiments of the present disclosure, when the answer is affirmative-response, the recording-player web-application 120*b* may be configured to present an annotation-marker in each start-timestamp of the related start-timestamps, via the UI 160*b* that is associated to the recording-player web-application 120*b*, on a timeline-bar.

According to some embodiments of the present disclosure, when the answer is negative, the recording-player web-application 120*b* may be configured to present the response via the UI 160*b* that is associated to the recording-player web-application 120*b*.

According to some embodiments of the present disclosure, by the configuration of the media-playback service in system 100B to operate the interaction-insights module 150*b*, the interactive-search module 170*b* and the extract-of interaction 180*b*, system 100B may address time and computer resources inefficiencies during the process of interactions evaluation when using the recording-player web-application 120*b*. For example, when using the recording-player web-application 120*b* for quality management and evaluation of interactions via a Quality Management (QM) application.

According to some embodiments of the present disclosure, during the process of evaluation that is performed via the QM application, instead of users entering and editing, when they listen to the call-recording or when they review the digital screen of the digital text interaction, media-playback service 120*b* may operate the interaction-insights module 150*b*, the interactive-search module 170*b* and the extract-of interaction 180*b* to reduce the amount of toggling of repeated play and pause, in order to enter the annotations as to preconfigured issues and suggestions in a point in time, thus reducing computer resources consumption and user-time spent in the process.

According to some embodiments of the present disclosure, the preconfigured issues, such as identifying agent upselling or ensuring compliance with taxation clauses, may vary from organization to organization. The AI models with LLM 185*b* may be tailored to address specific requirements.

According to some embodiments of the present disclosure, the identification of insights, such as greetings, checks and the like, as well as the chapters and highlights may be based on generic rules and applicable properties for different interactions belonging to different business verticals e.g., banking, insurance and the like.

According to some embodiments of the present disclosure, the interactive-search module 170*b* enables a response to specific questions of the industry or the organization. For example, the user may enter a polar-question, such as "Did the agent read out the disclaimer to the customer about how natural calamity-based accident is not covered in the insurance coverage.", which is an industry or company specific question that generic analytics may not determine.

According to some embodiments of the present disclosure, system 100B may simplify the annotation process during interactions evaluation, by eliminating the toggling of users of play and pause the recordings.

According to some embodiments of the present disclosure, the GenAI with LLM may be fine-tuned by running trial and error on a prompt question to find the question format or template that provides the most accurate result for a variety of different interaction transcripts. Also, retrieval augmented generation technique may be used where some sample transcripts and the insights, chapters, highlights may be retrieved and based on those transcripts it may be forwarded into the context of GenAI with LLM to fine-tune the LLM respond with better answers. The sample transcripts and insights may be retrieved from a repository of previously analyzed interactions. The sample transcripts and results may be verified by a user to ensure that accurate data is fed for the GenAI with LLM training.

Figure 1C:
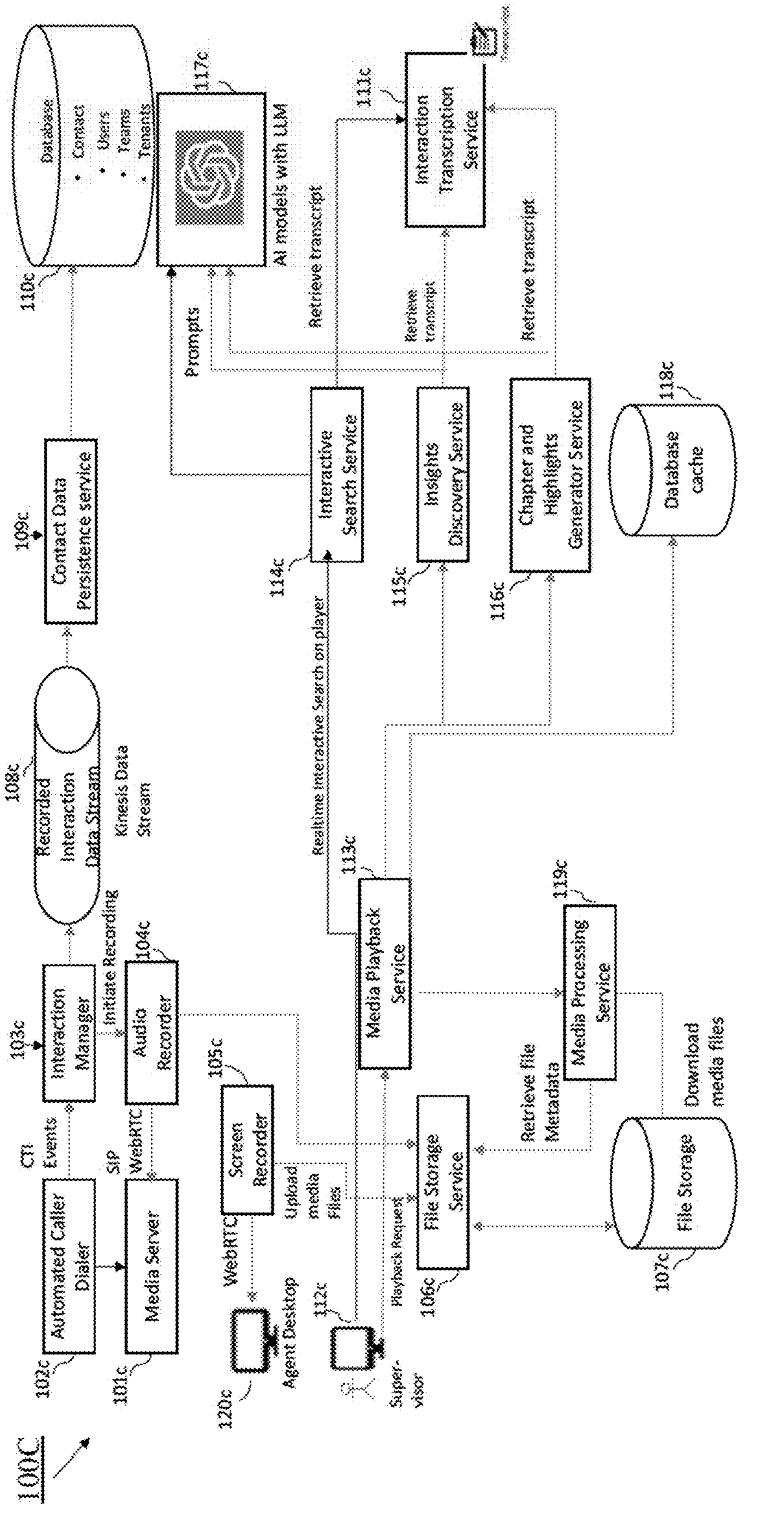

FIG. 1C schematically illustrate a high-level diagram of a computerized system 100C for reducing time taken for evaluation of an interaction by annotating a media-file of the interaction that has been recorded by a recording-player web-application based on an evaluation-measurement, in accordance with some embodiments of the present invention.

According to some embodiments of the present disclosure, system 100A in FIG. 1A and system 100B in FIG. 1B may be implemented in a system, such as system 100C.

According to some embodiments of the present disclosure, a service that accepts incoming interactions, such as Automated Caller Dialer (ACD) 102*c* routes the interactions to agents. The interactions may be voice calls or digital interactions. The ACD 102*c* may also handle outbound calls from the agent to the customers. The ACD 102*c* may send Computer-Telephone Integration (CTI) events to the Interaction Manager (IM) 103*c*. The IM 103*c* may coordinate the recording flow based on events which are received from the ACD 102*c*, such as connect, hold, transfer and disconnect. It may generate IM packets and send it to the recorded interaction data stream after the interaction is complete, e.g., disconnect event. The IM 103*c* also works with the audio and screen which are recorded for recording of the interactions.

According to some embodiments of the present disclosure, a media streaming server, such as media server 101*c* may be operated for the audio of the telephony.

According to some embodiments of the present disclosure, the audio recorder 104*c* service may operate the actual recording of the audio that is sent over protocols, such as Session Initiation Protocol (SIP) or Web Real-Time Communication (WebRTC) protocols. The final recorded media-file is uploaded to scalable distributed storage device using the file storage service. Audio is recorded in small parts, due to hold and resume of the interaction by the agent. When the call is put on hold there is no point in recording it and increasing the size of the media-file. The recording is in small parts also because of situations where there is a change of participants in the interaction like conferencing and transfer which can mean change in source of audio stream.

According to some embodiments of the present disclosure, since when the interaction is put on hold the time that the interaction is on hold is not recorded then, the hold may be identified by a bigger gap when the interaction resumes than in case of conversation lines. Also, the interaction metadata captures the time when the call was put on hold and then resumed so it may be used along with the transcript to identify a long gap between sentences as a hold.

According to some embodiments of the present disclosure, all the audio parts are associated with the same interaction, e.g., contact id. The audio recorder 104*c* may perform the transcoding of the audio media and converting it into Advanced Audio Coding (AAC) format at the time of archival.

According to some embodiments of the present disclosure, the screen recorder 105*c* service is recording screen capture from the agent desktop during the interaction. The final recorded media-file is uploaded to scalable distributed storage device using the file storage service 103*c*, which may use file storage, such as AWS S3 buckets. There is a screen recording for each agent participating in the interaction. Screen recordings are stored separately than the audio due to differences in the retention period applicable to each type of recording. Screen recorder is responsible to perform the transcoding of the video media and convert it into Advanced Video Coding (AVC), H264 format, at the time of archival.

According to some embodiments of the present disclosure, the agent desktop 120*c* is the desktop of the agent that is currently on the call with customer and related screen is being recorded for quality and compliance purposes. The agent desktop machine will have an agent desktop software that will be able to connect with screen recorder 105*c* using WebRTC protocol in order to capture and record the screen of the agent.

According to some embodiments of the present disclosure, the file storage service 106*c* is used to upload and download the recorded audio and screen media-files to and from the storage location. The files loaded in the storage are the media parts and not the final playable media file. The final playable media file can be audio and screen or only audio or only screen, but it will be processed MP4 format which has all the relevant parts stitched together so that the playback is in the right sequence and the right order, and the gaps are filled with silences to have continuous flow.

According to some embodiments of the present disclosure, the file storage service 106*c* is using a file storage 107*c*, such as Amazon Web Services (AWS) S3 buckets, infra structure underneath to store the actual files. The file storage service 106*c* acts a façade on top of the file storage 107*c* which maintains the access and metadata about the files whereas the actual files themselves are kept in file storage 107*c*.

According to some embodiments of the present disclosure, a data streaming component, such as recorded data interaction stream 108*c* streams data for consumers to consume, for example, AWS Kinesis data stream.

According to some embodiments of the present disclosure, the contact data persistence service 109*c* reads interaction data stream and persisting this data into the database 110*c* as contacts. A contact is an entity which represents a conversation of an agent with the customer.

According to some embodiments of the present disclosure, database 110*c* is a central datawarehouse where all the applications in the contact center bring in data. Metadata like user, teams, and tenants is also brought into this database

110*c*. Audit data related to different application and especially playback is also stored in the database 110*c*.

According to some embodiments of the present disclosure, the interaction transcribe service 111*c* generates a transcript once a media-file of an interaction is available. The transcribe service 111*c* receives events from the interaction data stream and then finds the contacts in the file storage service 106*c* and downloads them and then transcribe the audio to text using a speech to text services. In addition, the identification of participant, e.g., agent or customer and the start timestamp of each line of the transcript is performed by the interaction transcribe service 111*c*.

According to some embodiments of the present disclosure, the transcription is stored in the interaction transcribe service 111*c* for later use by interaction-insight module 150*b* in FIG. 1B, interactive-search module 170*b* in FIG. 1B and extract-of-interaction module 180*b* in FIG. 1B, which are operated by the media-playback service 130*b* in FIG. 1B, to construct a multi-step prompt which may be executed by the AI models with LLM 117*c*.

According to some embodiments of the present disclosure, the transcript may be shown to the user on the playback application, such as recording-player web-application 120*b* in FIG. 1B for the user to read the dialog between customer and agents. For digital interactions the speech to text is not required since the transcript is the chat between customer and agent itself. This chat is retrieved from the file storage 107*c* and processed in a consistent format with identification of the actor, e.g., agent/customer. Both phone and digital transcripts are stored in the interaction transcription service 111*c* and the transcripts are made available over Application Programming Interface (API) by contactID, i.e., identifier of the interaction.

According to some embodiments of the present disclosure, the supervisor desktop 112*c* may be used by a user who wants to view the playback of a recorded contact, e.g., interaction. The user has access to the recording-player web-application, such as recording-player web-application 120*a* in FIG. 1A and such as recording-player web-application 120*b* in FIG. 1B which can play the recorded interaction. The recording-player web-application may be opened in any browser. When the recording-player web-application is loaded it may call the media playback service 113*c* to retrieve the media location to play and the metadata required to populate the application UI, such as UI 160*b* in FIG. 1B.

According to some embodiments of the present disclosure, the media playback service 113*c*, such as media-playback service 130*a* in FIG. 1A and such as media-playback service 130*b* in FIG. 1B may handle playback requests and perform authentication and authorization checks before continuing with the playback processing. The playback request based on contactID is received by the media playback service 113*c* after authorization checks, this service may build a collection of stages which are a compilation of different events that happened in the call with respect to time of stages which are required to combine the segments of the call together to form a full playable media-file of the interaction in the correct order. There may be a plurality of segments of the media-file which were created due to hold and resume of the interaction or addition or change of agents that have to be stitched or combined together along with silence addition for hold time to create the full playable media-file.

According to some embodiments of the present disclosure, the interaction may be segmented due to hold and resume operations by the agent during the interaction or masking that has been performed during the call. The media playback service 113*c* may enable playing audio and screen media and only audio or only screen media as well. The media playback service 113*c* may operate as an orchestrator which calls other component services to get the interaction-insights module 150*b* in FIG. 1B, the interactive-search module 170*b* in FIG. 1B, and the extract-of-interaction module 180*b* in FIG. 1B operated. This is the front controller service which the front-end applications and clients interact with and has the public APIs for playback request processing.

According to some embodiments of the present disclosure, the media processing service 119*c* may receive from the media playback service 113*c* which files i.e., audio or screen has to be stitched together in which order and where silent audio or blank screens. Silent audio or blank screens need to be added to fill the gaps created due to holds or loss of recording due to network issues. This service utilizes, for example, the open source Fast Forward Moving Picture Experts Group (FFmpeg) tool to process media using commands. The final stitched media-file in MP4 format is uploaded to a file storage 107*c* and the address, URL to this file is returned to the media playback service 113*c*, which is returned to the end user that requested to initiate the playback. There is a front-end application which can consume this URL and run the media-file in a browser.

According to some embodiments of the present disclosure, an insight discovery service 115*c*, such as interaction-insights module 150*b* may be operated by the media playback service 113*c* to analyze and find insights about the interaction using the Generative AI on the transcript of the interaction. The insight discovery service 115*c* may identify issues in the interaction and may generate text-annotations and suggestions for improvement, in a point in time in the media-file of the interaction based on the timestamp of the line within the transcript. The insight discovery service 115*c* may operate Gen AI, such as AI modules with LLM 117*c* to find critical issues and problems in the conversation. The insights may be formulated as text-annotations to be added on the recording-player web-application along with corrective suggestive for the agent to improve for the next time.

According to some embodiments of the present disclosure, the media playback service 113*c*, such as media-playback service 130*a* in FIG. 1A and such as media-playback service 130*b* in FIG. 1B may call the insight discovery service 116*c*, such as extract-of-interaction module 180*b* in FIG. 1B. The insight discovery service 116*c* may prepare a short highlight video of the interaction by analyzing the interaction using Generative AI and finding portions as determined with hints in the multi-step prompt of the interaction that provides a meaningful highlight of the whole interaction.

According to some embodiments of the present disclosure, for example, the multi-step may be as follows:

"Calculate the call duration by subtracting the timestamp of the first line from the timestamp of the last line but do not show this calculation in the response. Create a short highlight of the call using the transcript so that the important parts of the call are collected in the highlights. The duration of the highlights should not be less than 10% of the duration of the call. Pick small portions from the important sections to cover the whole call. The highlights should focus on the reason of the call, the resolution offered by the agent, customers reaction to the solution provided, any escalation, customer sentiment degradation, actions taken by agent and next steps agreed by agent. The response should contain only the start and end timestamp of each highlight identified."

According to some embodiments of the present disclosure, the response may be

"Highlights:
Reason for Call:
Start Timestamp: 2023-07-18 10:00 AM
End Timestamp: 2023-07-18 10:05 AM
Resolution Offered by Agent:
Start Timestamp: 2023-07-18 10:15 AM
End Timestamp: 2023-07-18 10:20 AM
Customer Reaction:
Start Timestamp: 2023-07-18 10:25 AM
End Timestamp: 2023-07-18 10:30 AM
Escalation:
Start Timestamp: 2023-7-18 10:35 AM
End Timestamp: 2023-07-18 10:40 AM
Agent Action:
Start Timestamp: 2023-07-18 10:45 AM
End Timestamp: 2023-07-18 10:50 AM
Next Steps Agreed by Agent:
Start Timestamp: 2023-07-18 10:55 AM
End Timestamp: 2023-07-18 11:00 AM"

According to some embodiments of the present disclosure, the abbreviated media-file also provides a way to recap the whole interaction post hearing it since hearing the call one time is not enough generally and the listener tends to forget important sections. The insight discovery service 116*c* may also create sections, e.g., chapters which indicate different sections of the call with the relevant headings, for easy traversal by the user. An annotation is a point in time message shown on the recording-player web-application, to show what was the issue or what is wrong in the agents behavior at that a point in time.

According to some embodiments of the present disclosure, the interactive search service 114*c*, such as interactive-search module 170*b* in FIG. 1B has public APIs that the recording-player web-application can call in real time. The interactive search service 114*c* provides the ability to the end customer, e.g., supervisor or evaluator to ask questions in natural language and be able to find answers to those questions and highlight the relevant portion of the call and transcript to take the use directly to the part which is relevant to the question.

According to some embodiments of the present disclosure, for example a user may ask "show all the places where the customer was found to be angry" and the recording-player web-application may operate the interactive search service 114*c* and highlight the answer to the question on the timeline bar. In another example, a user may ask "did the agent greet the customer and thanked them before closing the call" and the recording-player web-application may operate the interactive search service 114*c* and present the answer in a highlighted box showing yes or no and also highlight that part on the transcript and the timeline.

According to some embodiments of the present disclosure, the AI models with LLM 117*c* and related APIs, e.g., AWS Open AI services, which execute the multi-step prompt to result with a response may be used to generate insights, chapters, highlights, and search answers. A database cache 118*c*, such as AWS managed Redis cluster, may be used to store the generated insights, text-annotations, sections, e.g., chapters for each interaction such that when the interaction with the contact ID may be played then it may be used instead of regenerating it again which may improve the computer performance and reduce load on the system.

FIG. 2 schematically illustrates a high-level diagram of a computerized-method 200 for reducing time taken for evaluation of an interaction by annotating a media-file of the interaction that has been recorded by a recording-player web-application based on an evaluation-measurement, in accordance with some embodiments of the present invention.

According to some embodiments of the present disclosure, operation 210 comprising receiving a request from a user to playback the media-file of the interaction by operating the media-playback service of the recording-player web-application;

According to some embodiments of the present disclosure, operation 220 comprising configuring the media-playback service to: a. operate an interaction-insights module to generate one or more point-in-time annotations of the media-file, based on one or more parameters of the evaluation-measurement; and b. send the one or more point-in-time annotations and a location of the media-file to the recording-player web-application.

According to some embodiments of the present disclosure, operation 230 comprising configuring the recording-player web-application to playback the media-file and upon a user-selection to present each point-in-time annotation of the one or more point-in-time annotations, via a User Interface (UI) that is associated to the recording-player web-application, on a timeline-bar as an annotation-marker. Each point-in-time annotation comprising a playhead position in the media-file and a text-annotation related to a parameter of the one or more parameters of the evaluation-measurement.

Figure 3:
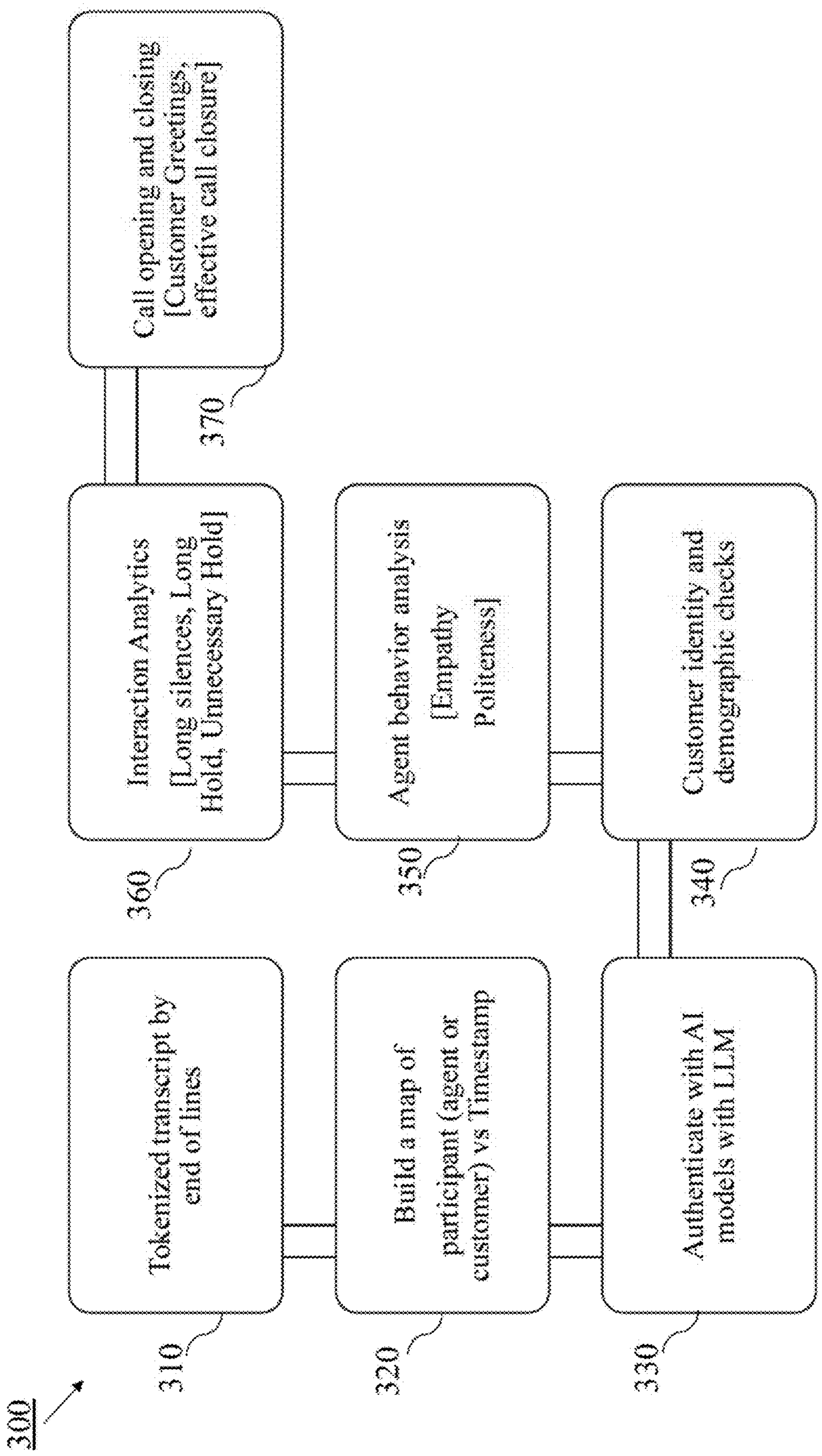
FIG. 3 is a schematic workflow of an interaction-insights module, in accordance with some embodiments of the present invention.

FIG. 3 is a schematic workflow 300 of an interaction-insights module, in accordance with some embodiments of the present invention.

According to some embodiments of the present disclosure, the insights discovery service 114*c* in FIG. 1C, such as interaction-insights module 150*a* in FIG. 1A and such as interaction-insights module 150*b* in FIG. 1B require that the transcript should be retrieved and processed to be in a structure which will enable discovery of insights and locating the relevant time when the insight happened in the timeline of the call. An interaction transcription service, such as interaction transcription service 111*c* in FIG. 1C may provide a tokenized transcript by end of line 310.

According to some embodiments of the present disclosure, a map of participant, e.g., agent or customer vs timestamp may be built 320. A map of timestamp and sentence lines in the interaction may be created to correlate between the time and the sentences in the conversation.

According to some embodiments of the present disclosure, authenticate with GenAI models with LLM 3330 such that the AI services may be available. A session of the GenAI with LLM, such as AI models with Large Language Model (LLM) 185*b* in FIG. 1B may be created by providing authentication credentials to have access to the GenAI APIs such that the multi-step prompt may be executed.

According to some embodiments of the present disclosure, the interaction-insights module may include several modules, each module may operate for an evaluation measurement. For example, evaluation measurement for validities and checks, such as customer identity and demographic checks 340. This evaluation measurement may assess that the agent has properly established the identity of the customer and that the agent also tried to verify the identity but using the demographics questions to make sure that the customers are who they say they are. This is a security step which commonly needs to be reviewed in the evaluation of the interaction but is a repetitive task and hence this check may reduce the workload of the evaluator as well as reduce computer resources consumption of the toggling of the pause button on and off in the recording-player web-application. This check is also useful to make sure that the agent is not getting tricked by hackers which are posing as customers, in giving out information about the real customer.

According to some embodiments of the present disclosure, the interaction-insights module may also include a module for evaluation measurement of agent behavior, e.g., agent behavior analysis, such as empathy and politeness 350. The agent behavior analysis may include looking for agent soft skills and specially cases where the agent behavior was not proper during the interaction. This module of agent behavior analysis may focus on critical aspects of agent behavior like politeness and empathy towards customer during the interaction. It may be expanded to look for other important soft skill aspects that are necessary for a good customer experience.

According to some embodiments of the present disclosure, the interaction-insights module may also include may also include a module for evaluation measurement of the interaction, such as interaction analytics 360. The interaction analytics may find parameters, such as long silence, long hold, and unnecessary hold. The hold and silences may be found by a comparison to a predefined threshold during the interaction. Moreover, the interaction analytics 360 may try to uncover unnecessary holds such as a hold post greeting the customer goodbye. These may be issues that will be presented in the suggestion section, such that it may be clarified to the agent for the agent improvement.

According to some embodiments of the present disclosure, the interaction-insights module may also include a module for evaluation measurement of call opening and closing 370. The evaluation measurement may include checking of customer greetings and effective call closure. The checking of the call opening and closing 370 may include verifying whether the agent greets the customer at beginning and closes the call with courtesy and summary.

Figure 4:
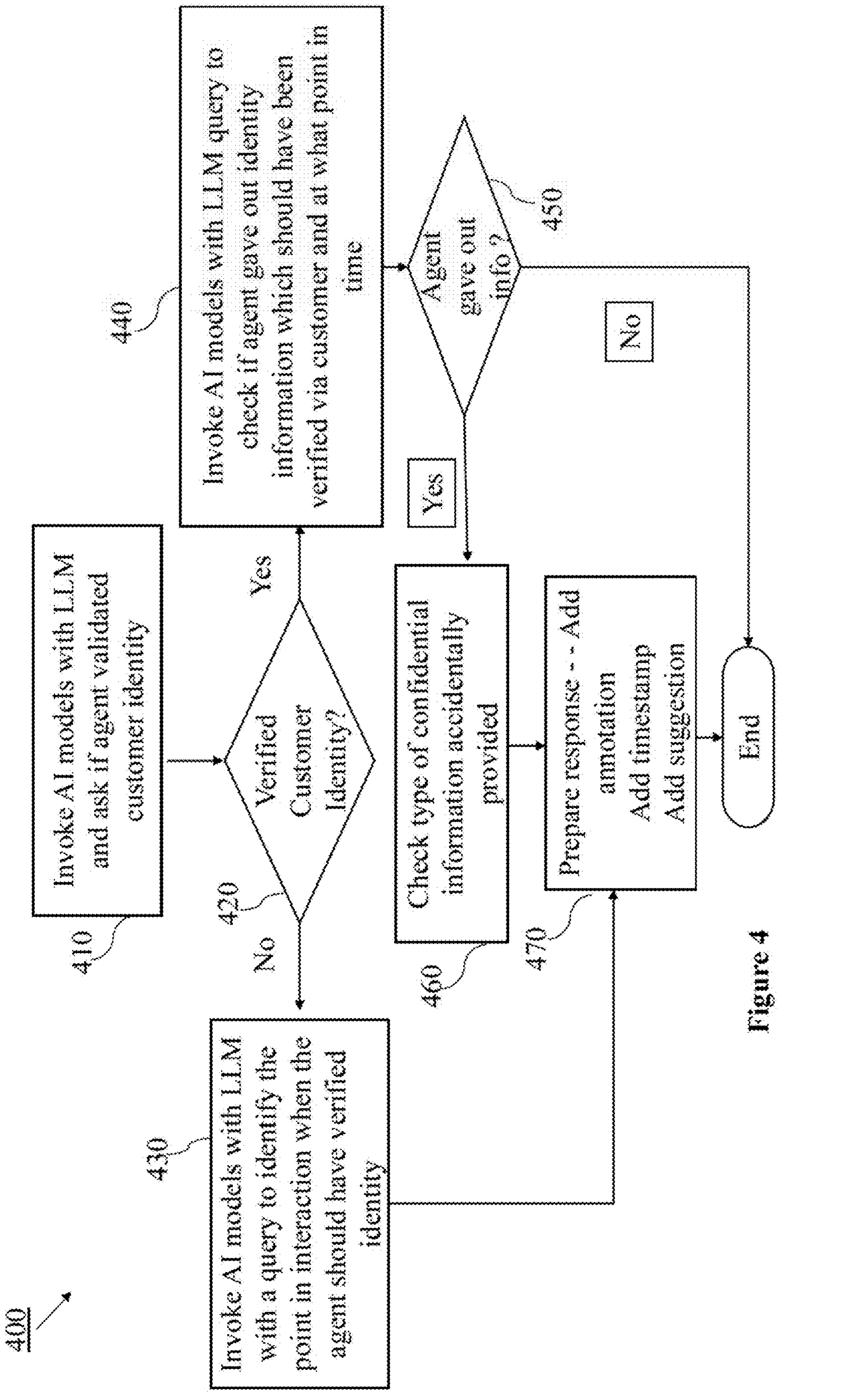
FIG. 4 is a schematic workflow of customer identity and demographic checks, in accordance with some embodiments of the present invention.

FIG. 4 is a schematic workflow 400 of customer identity and demographic checks, in accordance with some embodiments of the present invention.

According to some embodiments of the present disclosure, interaction-insights module, such as interaction-insights module 150*a* in FIG. 1A and interaction-insights module 150*b* in FIG. 1B may include several modules, each module may operate for an evaluation measurement. For example, evaluation measurement for validities and checks, such as customer identity and demographic checks 340 in FIG. 3.

According to some embodiments of the present disclosure, the operation of the customer identity and demographic check may include invoking AI models with LLM and ask if agent validated customer identity 410 by executing AI models, such as AI models with Large Language Model (LLM) 185*b* in FIG. 1B with the transcript and the prompt to check if the agent validated customer identity.

According to some embodiments of the present disclosure, when the result of the executed AI models with LLM to the check is negative then invoking the AI models with LLM query to identify the point in the interaction when the agent should have verified identity 430. when the result of the executed AI models with LLM to the check is affirmative, then invoking the AI models with LLM query to check if agent gave out identity information which should have been verified via customer and at what point in time 440.

According to some embodiments of the present disclosure, checking if the agent gave out information of the customer during the interaction 450. If the agent gave out information, then checking type of confidential information accidently provided 460 and then prepare response, add text annotation, timestamp, and suggestion 470. For example, as shown in FIG. 8.

Figure 5:
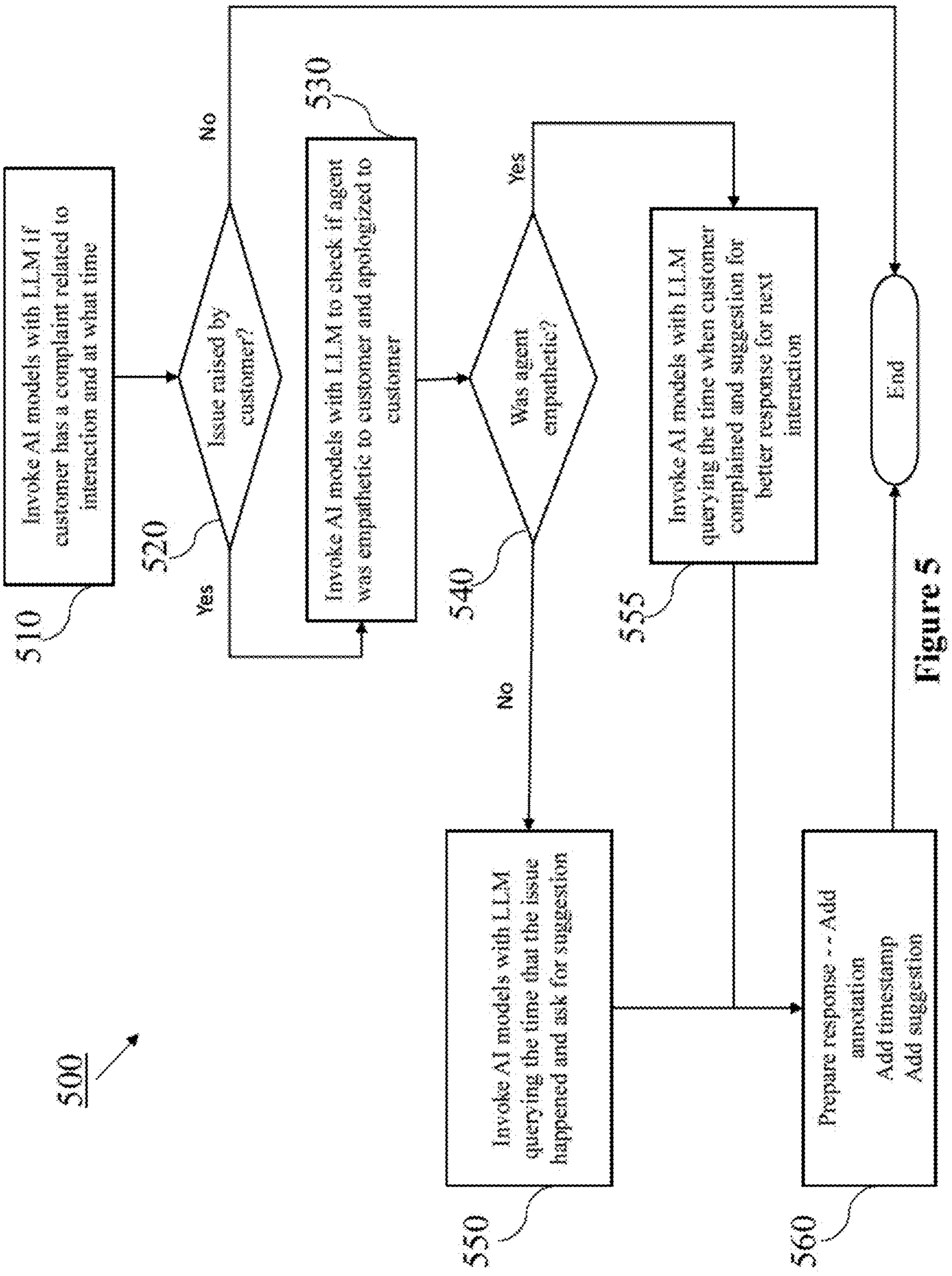
FIG. 5 is a schematic workflow of agent behavior analysis, in accordance with some embodiments of the present invention.

FIG. 5 is a schematic workflow 500 of agent behavior analysis, in accordance with some embodiments of the present invention.

According to some embodiments of the present disclosure, interaction-insights module, such as interaction-insights module 150*a* in FIG. 1A and interaction-insights module 150*b* in FIG. 1B may include several modules, each module may operate for an evaluation measurement. For example, evaluation measurement for agent behavior analysis, such as empathy and politeness 350 in FIG. 3.

According to some embodiments of the present disclosure, the operation of the agent behavior analysis may include invoking AI models with LLM if customer has a compliant related to interaction and at what point in time 510.

According to some embodiments of the present disclosure, if the customer had a complaint, e.g., issue raised by customer 520 then invoking AI models with LLM to check if agent was empathic to customer and apologized to customer 530.

According to some embodiments of the present disclosure, checking if agent was empathic 540. If the check is affirmative, then invoking AI models with LLM querying the time when the customer complained and providing suggestion for a better response in the next interaction 555. If the check if the agent was empathic is negative, then invoking AI models with LLM querying the time that the issue happened and ask for suggestions 550.

According to some embodiments of the present disclosure, preparing response, add text annotation, timestamp, and suggestion 560. For example, as shown in FIG. 9.

Figure 6:
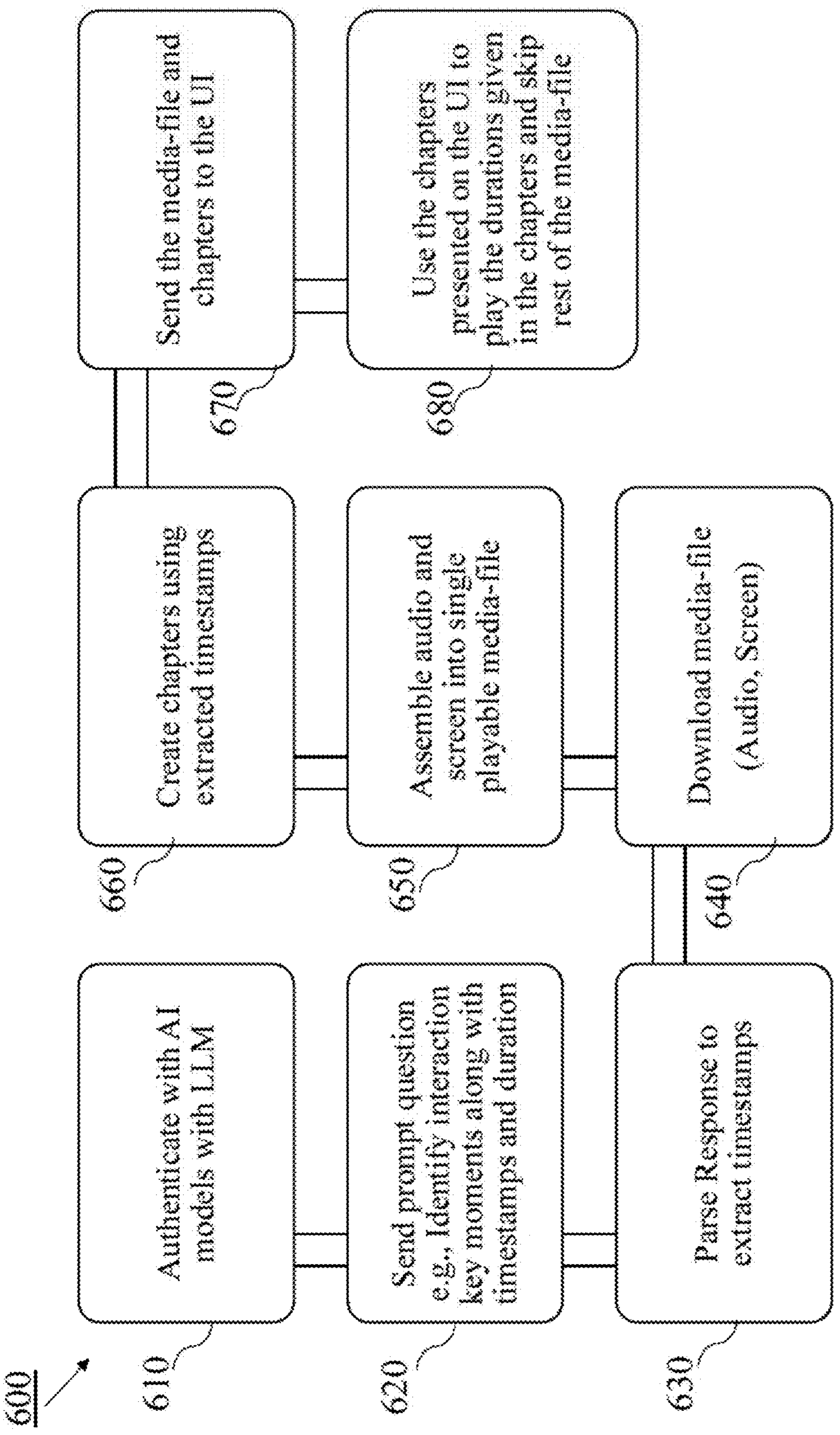
FIG. 6 is a schematic workflow of extract-of-interaction module, in accordance with some embodiments of the present invention.

FIG. 6 is a schematic workflow 600 of extract-of-interaction module, in accordance with some embodiments of the present invention.

According to some embodiments of the present disclosure, the chapter, and highlights generator service 116*c* in FIG. 1C, such as extract-of-interaction module 180*b* in FIG. 1B requires that the transcript should be retrieved and processed to be in a structure which will enable identification of key moments in the interaction.

According to some embodiments of the present disclosure, retrieving a transcript of the interaction based on an interaction-identifier of the interaction. The transcript may be tokenized into one or more sentences, and each sentence in the one or more sentences is labeled with a start-timestamp and a participant-role.

According to some embodiments of the present disclosure, executing AI models with Large Language Model (LLM) with the transcript and an excerpt-prompt to yield one or more portions of the transcript and an associated chapter-name for each portion. Each portion in the one or more portions has an associated start-timestamp and end-timestamp. Authenticate with AI models with LLM 610 by providing credentials to access the GenAI APIs.

According to some embodiments of the present disclosure, sending prompt question, e.g., identify interaction key moments along with timestamps and duration 620.

According to some embodiments of the present disclosure, parsing the yielded response to extract the timestamps, i.e., start-timestamp and end-timestamp of each portion.

According to some embodiments of the present disclosure, downloading the medial file, which may be an audio file or an audio file and a video file which is the recording of the screen of the agent desktop during the interaction 640. Cutting-out one or more segments from the media-file based on the associated start-timestamp and end-timestamp of each portion;

According to some embodiments of the present disclosure, combining the one or more segments based on the start-timestamp of each segment to yield the abbreviated media-file by assembling the audio and screen into a single playable media-file, such as MP4 650 or such as H264 which is a video recording codec playable in all browsers.

According to some embodiments of the present disclosure, creating chapters by using the extracted timestamps 660. Creating chapters in the abbreviated media-file by marking each segment in the abbreviated media-file as a chapter and assigning the associated chapter name as a title of the chapter.

According to some embodiments of the present disclosure, sending the media-file and chapters to the UI of the recording-player web-application, such as UI 160*b* in FIG. 1B.

According to some embodiments of the present disclosure, using the chapters presented on the UI to play the durations given in the chapters and skip the rest of the media-file 680 when a chapter is selected by a user. For example, as shown in FIG. 15.

Figure 16:
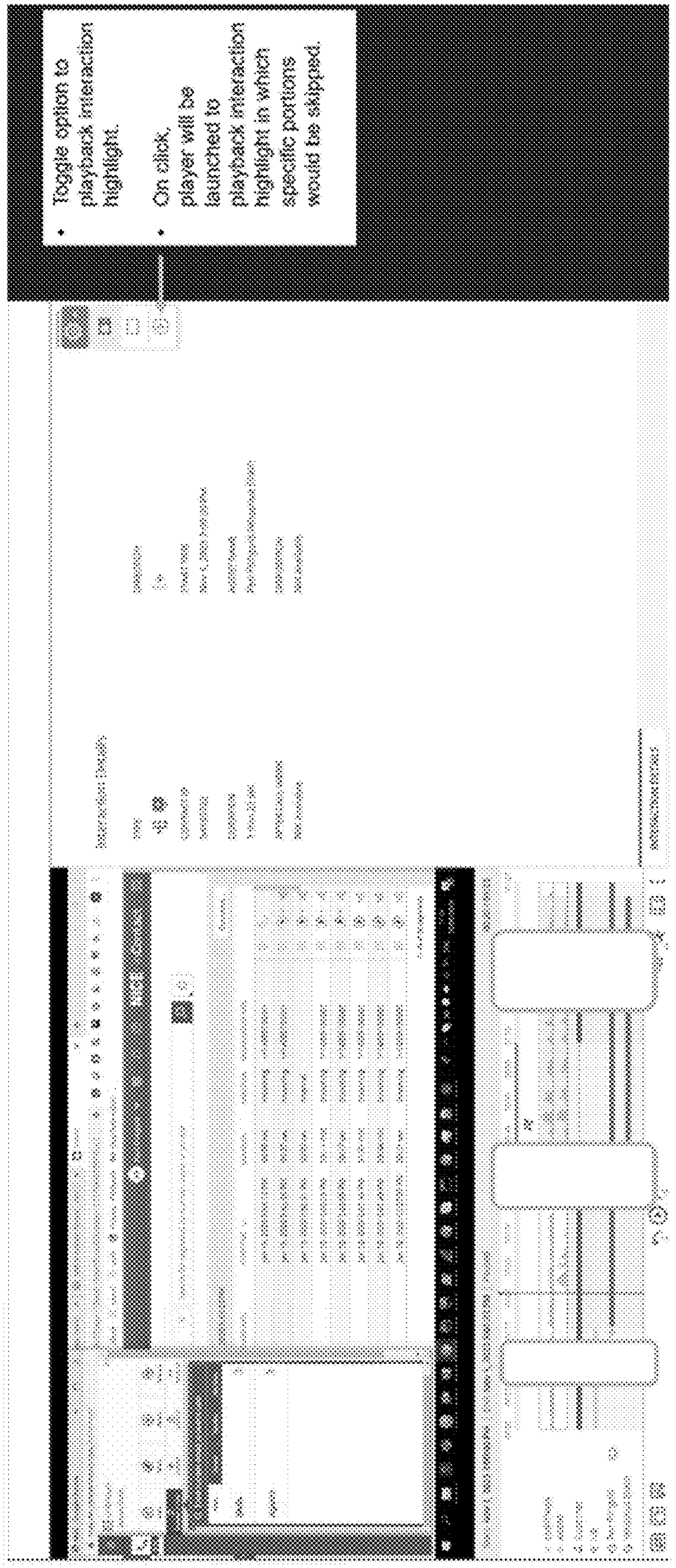
FIG. 16 is an example of a screenshot for user-selection to playback the abbreviated media-file, in accordance with some embodiments of the present invention.

According to some embodiments of the present disclosure, when a chapter is not selected by the user via the UI the recording-player web-application may be configured to playback the abbreviated media-file. For example, as shown in FIG. 16.

Figure 7:
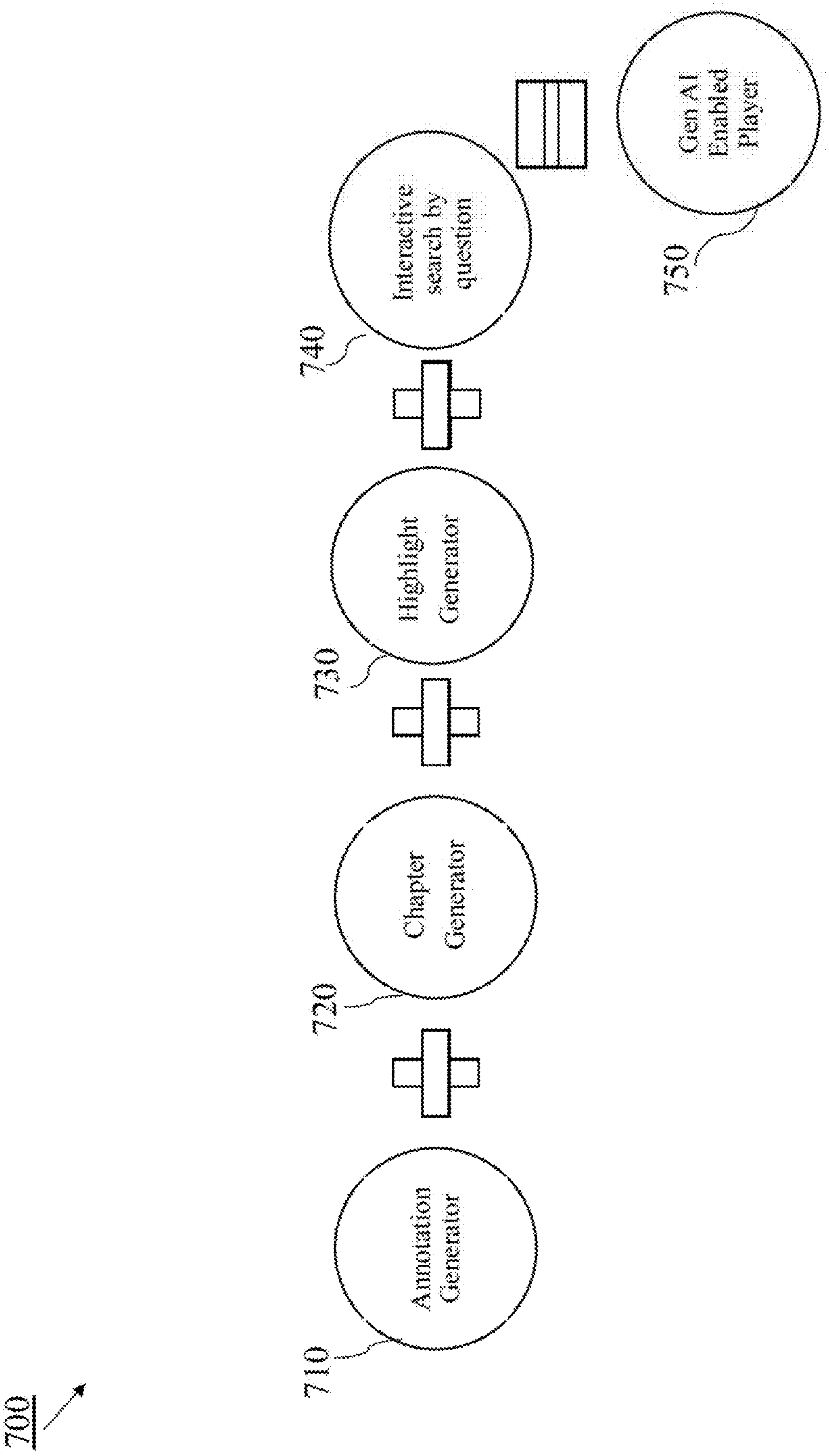
FIG. 7 schematically illustrates a high-level diagram of a GenAI recording-player web-application based on an evaluation-measurement, in accordance with some embodiments of the present invention.

FIG. 7 schematically illustrates a high-level diagram 700 of a GenAI recording-player web-application based on an evaluation-measurement, in accordance with some embodiments of the present invention.

According to some embodiments of the present disclosure, a system, such as system 100B may be implemented and make the recording-player web-application GenAI enabled, e.g., GenAI enabled player 750 having an annotation generator 710, chapter generator 720, highlight generator 730 and interactive search by question 740 functionalities.

According to some embodiments of the present disclosure, the annotation generator, may be implemented by interaction-insights module 150*b* in FIG. 1B. The chapter generator 720 and the highlight generator 730 may be implemented by the extract-of-interaction module 180*b* in FIG. 1B. The interactive search by question 740 may be generated by the interactive-search module 170*b* in FIG. 1B.

It should be understood with respect to any flowchart referenced herein that the division of the illustrated method into discrete operations represented by blocks of the flowchart has been selected for convenience and clarity only. Alternative division of the illustrated method into discrete operations is possible with equivalent results. Such alternative division of the illustrated method into discrete operations should be understood as representing other embodiments of the illustrated method.

Similarly, it should be understood that, unless indicated otherwise, the illustrated order of execution of the operations represented by blocks of any flowchart referenced herein has been selected for convenience and clarity only. Operations of the illustrated method may be executed in an alternative order, or concurrently, with equivalent results. Such reordering of operations of the illustrated method should be understood as representing other embodiments of the illustrated method.

Different embodiments are disclosed herein. Features of certain embodiments may be combined with features of other embodiments; thus, certain embodiments may be combinations of features of multiple embodiments. The foregoing description of the embodiments of the disclosure has been presented for the purposes of illustration and description. It is not intended to be exhaustive or to limit the disclosure to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the disclosure.

While certain features of the disclosure have been illustrated and described herein, many modifications, substitutions, changes, and equivalents will now occur to those of ordinary skill in the art. It is, therefore, to be understood that the appended claims are intended to cover all such modifications and changes as fall within the true spirit of the disclosure.

What is claimed:

1. A computerized-method for reducing time taken for evaluation of an interaction by annotating a media-file of the interaction that has been recorded by a recording-player web-application based on an evaluation-measurement, said computerized-method comprising:

(i) receiving a request from a user to playback the media-file of the interaction by operating the media-playback service of the recording-player web-application;

(ii) configuring the media-playback service to:

a. operate an interaction-insights module to generate one or more point-in-time annotations of the media-file, based on one or more parameters of the evaluation-measurement, said interaction-insights module comprises:

(a) retrieving a transcript of the interaction based on an interaction-identifier of the interaction, wherein the transcript is tokenized into one or more sentences, and wherein each sentence in the one or more sentences is labeled with a start-timestamp and a participant-role, (b) constructing a multi-step prompt based on the transcript and one or more polar-questions related to appearance of the evaluation-measurement and the one or more parameters in the transcript, the participant-role, and the start-timestamp;

(c) executing Artificial Intelligence (AI) models with the multi-step prompt to yield a response, for the evaluation-measurement and the one or more parameters, wherein the response comprising an answer to each polar-question, the participant-role, and the start-timestamp, and wherein the answer is one of: affirmative-response and negative-response;

for each parameter of the one or more parameters of the evaluation-measurement:

(d) when the answer is affirmative generating the text-annotation based on the participant-role, the parameter, and a start-timestamp;

(e) when the answer is negative, generating the text-annotation based on the parameter and a provided start-timestamp, wherein the start-timestamp is provided by a first-step in the multi-step prompt which requires to search the start-timestamp related to absence of the parameter to yield the provided start-timestamp;

(f) generating a suggestion based on the answer by a second-step in the multi-step prompt and adding the suggestion to the text-annotation; and (g) adding the point-in-time annotation, wherein the point-in-time annotation is added with the start-timestamp as the playhead position in the media-file and the generated text-annotation, and b. send the one or more point-in-time annotations and a location of the media-file to the recording-player web-application; and (iii) configuring the recording-player web-application to playback the media-file and upon a user-selection to present each point-in-time annotation of the one or more point-in-time annotations, via a User Interface (UI) that is associated to the recording-player web-application, on a timeline-bar as an annotation-marker, wherein each point-in-time annotation comprising a playhead position in the media-file and a text-annotation related to a parameter of the one or more parameters of the evaluation-measurement.

2. The computerized-method of claim 1, wherein the computerized-method is checking and annotating the media-file of the interaction based on one or more evaluation-measurements.

3. The computerized-method of claim 1, wherein the evaluation-measurement is one of: (i) customer demography and identification; (ii) agent behavior analysis; (iii) interaction analytics; and (iv) interaction opening and closing, wherein the one or more parameters of the customer demography and identification is at least one of: a. customer identity verification; b. identify information compromised; and c. customer demographic check, wherein the one or more parameters of the agent behavior analysis is at least one of: a. empathy; b. politeness, wherein the one or more parameters of the interaction analytics is at least one of: a. no delays; b. silence; c. long holds; and d. unnecessary holds, and wherein the one or more parameters of the interaction opening and closing is at least one of:

a. greetings at the opening of the interaction; and b. greetings at the closing of the interaction.

4. The computerized-method of claim 1, wherein the user-selection is one of: first user-selection of the annotation-marker on the timeline-bar, to display the text-annotation related to the evaluation measurement on the timeline-bar, and second user-selection of all-annotation-markers, to display each text-annotation related to the evaluation measurement of the one or more point-in-time annotations on the timeline-bar.

5. The computerized-method of claim 4, wherein the first user-selection and the second user-selection are operated by at least one of: (i) mouse click; (ii) keystroke; and (iii) keystroke combination.

6. The computerized-method of claim 4, wherein each generated point-in-time annotation of the one or more point-in-time annotations of the media-file is stored as an attribute of the interaction in a database.

7. The computerized-method of claim 1, wherein said computerized-method is further comprising configuring the media-playback service to operate an extract-of-interaction module to generate an abbreviated media-file including one or more sections, each section has a point-in-time annotation, wherein said extract-of-interaction model comprising:

(i) retrieving a transcript of the interaction based on an interaction-identifier of the interaction, wherein the transcript is tokenized into one or more sentences, and wherein each sentence in the one or more sentences is labeled with a start-timestamp and a participant-role;

(ii) executing AI models with Large Language Model (LLM) with the transcript and an excerpt-prompt to yield one or more portions of the transcript and an associated chapter-name for each portion, wherein each portion in the one or more portions has an associated start-timestamp and end-timestamp;

(iii) cutting-out one or more segments from the media-file based on the associated start-timestamp and end-timestamp of each portion;

(iv) combining the one or more segments based on the start-timestamp of each segment to yield the abbreviated media-file; and (v) creating chapters in the abbreviated media-file by marking each segment in the abbreviated media-file as a chapter and assigning the associated chapter name as a title of the chapter;

and configuring the recording-player web-application to present the abbreviated media-file and the chapter-name of each segment in the abbreviated media-file via the UI.

8. The computerized-method of claim 7, wherein the computerized-method is further comprising configuring the recording-player web-application to playback the abbreviated media-file upon a first user-selection of the abbreviated media-file via the UI.

9. The computerized-method of claim 7, wherein the computerized-method is further comprising configuring the recording-player web-application to playback the segment upon a second user-selection of the chapter-name via the UI.

10. The computerized-method of claim 1, wherein said computerized-method is further comprising configuring the media-playback service to operate an interactive-search module to enable search in the media-file by text-questions via the recording-player web-application, said interactive-search module comprising:

(i) receiving a polar-query in natural language from a user via the UI that is associated to the recording-player web-application;

(ii) retrieving a transcript of the interaction based on an interaction-identifier of the interaction, wherein the transcript is tokenized into one or more sentences, and wherein each sentence in the one or more sentences is labeled with a start-timestamp and a participant-role;

(iii) constructing a search-prompt with the transcript, the polar-query in natural language and a request for one or more related start-timestamps embedded therein; and (iv) executing AI models with LLM with the search-prompt to yield a response and the one or more related start-timestamps, wherein when the response is affirmative, configuring the recording-player web-application to present an annotation-marker in each start-timestamp of the one or more related start-timestamps, via the UI that is associated to the recording-player web-application, on a timeline-bar, and wherein when the response is negative, configuring the recording-player web-application to present the response via the UI that is associated to the recording-player web-application.

11. A computerized-system for reducing time taken for evaluation of an interaction by annotating a media-file of an interaction that has been recorded by a recording-player web-application based on an evaluation-measurement, said computerized-system comprising:

one or more processors, said one or more processors are configured to:

(i) receive a request from a user to playback the media-file of the interaction by operating the media-playback service of the recording-player web-application;

(ii) configure the media-playback service to:

a. operate an interaction-insights module to generate one or more point-in-time annotations of the media-file, based on one or more parameters of the evaluation-measurement, said interaction-insights module comprises:

(a) retrieving a transcript of the interaction based on an interaction-identifier of the interaction, wherein the transcript is tokenized into one or more sentences, and wherein each sentence in the one or more sentences is labeled with a start-timestamp and a participant-role, (b) constructing a multi-step prompt based on the transcript and one or more polar-questions related to appearance of the evaluation-measurement and the one or more parameters in the transcript, the participant-role, and the start-timestamp;

(c) executing Artificial Intelligence (AI) models with the multi-step prompt to yield a response, for the evaluation-measurement and the one or more parameters, wherein the response comprising an answer to each polar-question, the participant-role, and the start-timestamp and wherein the answer is one of: affirmative-response and negative-response;

for each parameter of the one or more parameters of the evaluation-measurement;

(d) when the answer is affirmative generating the text-annotation based on the participant-role, the parameter, and a start-timestamp;

(e) when the answer is negative, generating the text-annotation based on the parameter and a provided start-timestamp, wherein the start-timestamp is provided by a first-step in the multi-step prompt which requires to search the start-timestamp related to absence of the parameter to yield the provided start-timestamp;

(f) generating a suggestion based on the answer by a second-step in the multi-step prompt and adding the suggestion to the text-annotation; and (g) adding the point-in-time annotation, wherein the point-in-time annotation is added with the start-timestamp as the playhead position in the media-file and the generated text-annotation, and b. send the one or more point-in-time annotations and a location of the media-file to the recording-player web-application;

(iii) configure the recording-player web-application to playback the media-file and present each point-in-time annotation of the one or more point-in-time annotations, upon a user-selection, via a User Interface (UI) that is associated to the recording-player web-application, on a timeline-bar as an annotation-marker, wherein each point-in-time annotation comprising a playhead position in the media-file and a text-annotation related to a parameter of the one or more parameters of the evaluation-measurement.

12. The computerized-system of claim 11, wherein the one or more processors are further configured to check and annotate the media-file of the interaction based on one or more evaluation-measurements.

13. The computerized-system of claim 11, wherein the evaluation-measurement is one of: (i) customer demography and identification; (ii) agent behavior analysis; (iii) interaction analytics; and (iv) interaction opening and closing, wherein the one or more parameters of the customer demography and identification is at least one of: a. customer identity verification; b. identify information compromised; and c. customer demographic check, wherein the one or more parameters of the agent behavior analysis is at least one of: a. empathy; b. politeness, wherein the one or more parameters of the interaction analytics is at least one of: a. no delays; b. silence; c. long holds; and d. unnecessary holds, and wherein the one or more parameters of the interaction opening and closing is at least one of:

a. greetings at the opening of the interaction; and b. greetings at the closing of the interaction.

14. The computerized-system of claim 11, wherein the user-selection is one of: first user-selection of the annotation-marker on the timeline-bar, to display the text-annotation related to the evaluation measurement on the timeline-bar, and second user-selection of all-annotation-markers, to display each text-annotation related to the evaluation measurement of the one or more point-in-time annotations on the timeline-bar.

15. The computerized-system of claim 14, wherein the first user-selection and the second user-selection are operated by at least one of: (i) mouse click; (ii) keystroke; (iii) keystroke combination; and (iv) other form of selection.

16. The computerized-system of claim 14, wherein each generated point-in-time annotation of the one or more point-in-time annotations of the media-file is stored as an attribute of the interaction in a database.

17. The computerized-system of claim 11, wherein said one or more processors are further configured to configure the media-playback service to operate an extract-of-interaction module to generate an abbreviated media-file including one or more sections, each section has a point-in-time annotation, wherein said extract-of-interaction model comprising:

(i) retrieving a transcript of the interaction based on an interaction-identifier of the interaction, wherein the transcript is tokenized into one or more sentences, and wherein each sentence in the one or more sentences is labeled with a start-timestamp and a participant-role;

(ii) executing AI models with Large Language Model (LLM) with the transcript and an excerpt-prompt to yield one or more portions of the transcript and an associated chapter-name for each portion, wherein each portion in the one or more portions has an associated start-timestamp and end-timestamp;

(iii) cutting-out one or more segments from the media-file based on the associated start-timestamp and end-timestamp of each portion;

(iv) combining the one or more segments based on the start-timestamp of each segment to yield the abbreviated media-file; and (v) creating chapters in the abbreviated media-file by marking each segment in the abbreviated media-file as a chapter and assigning the associated chapter name as a title of the chapter;

and configure the recording-player web-application to present the abbreviated media-file and the chapter-name of each segment in the abbreviated media-file via the UI.

18. The computerized-system of claim 17, wherein said one or more processors are further configured to configuring the recording-player web-application to playback the abbreviated media-file upon a first user-selection of the abbreviated media-file via the UI.

19. The computerized-system of claim 17, wherein said one or more processors are further configured to configuring the recording-player web-application to playback the segment upon a second user-selection of the chapter-name via the UI.

20. A computerized-method for reducing time taken for evaluation of an interaction by annotating a media-file of the interaction that has been recorded by a recording-player web-application based on an evaluation-measurement, said computerized-method comprising:

(i) receiving a request from a user to playback the media-file of the interaction by operating the media-playback service of the recording-player web-application;

(ii) configuring the media-playback service to:

a. operate an interaction-insights module to generate one or more point-in-time annotations of the media-file, based on one or more parameters of the evaluation-measurement;

b. send the one or more point-in-time annotations and a location of the media-file to the recording-player web-application;

c. operate an interactive-search module to enable search in the media-file by text-questions via the recording-player web-application, said interactive-search module comprising:

(a) receiving a polar-query in natural language from a user via the UI that is associated to the recording-player web-application;

(b) retrieving a transcript of the interaction based on an interaction-identifier of the interaction, wherein the transcript is tokenized into one or more sentences, and wherein each sentence in the one or more sentences is labeled with a start-timestamp and a participant-role;

(c) constructing a search-prompt with the transcript, the polar-query in natural language and a request for one or more related start-timestamps embedded therein; and (d) executing AI models with LLM with the search-prompt to yield a response and the one or more related start-timestamps, wherein when the response is affirmative, configuring the recording-player web-application to present an annotation-marker in each start-timestamp of the one or more related start-timestamps, via the UI that is associated to the recording-player web-application, on a timeline-bar, and wherein when the response is negative, configuring the recording-player web-application to present the response via the UI that is associated to the recording-player web-application; and (iii) configuring the recording-player web-application to playback the media-file and upon a user-selection to present each point-in-time annotation of the one or more point-in-time annotations, via a User Interface (UI) that is associated to the recording-player web-application, on a timeline-bar as an annotation-marker, wherein each point-in-time annotation comprising a playhead position in the media-file and a text-annotation related to a parameter of the one or more parameters of the evaluation-measurement.

21. A computerized-system for reducing time taken for evaluation of an interaction by annotating a media-file of an interaction that has been recorded by a recording-player web-application based on an evaluation-measurement, said computerized-system comprising:

one or more processors, said one or more processors are configured to:

(i) receive a request from a user to playback the media-file of the interaction by operating the media-playback service of the recording-player web-application;

(ii) configure the media-playback service to:

a. operate an interaction-insights module to generate one or more point-in-time annotations of the media-file, based on one or more parameters of the evaluation-measurement; and b. send the one or more point-in-time annotations and a location of the media-file to the recording-player web-application;

c. operate an interactive-search module to enable search in the media-file by text-questions via the recording-player web-application, said interactive-search module comprises:

(a) receiving a polar-query in natural language from a user via the UI that is associated to the recording-player web-application;

(b) retrieving a transcript of the interaction based on an interaction-identifier of the interaction, wherein the transcript is tokenized into one or more sentences, and wherein each sentence in the one or more sentences is labeled with a start-timestamp and a participant-role;

(c) constructing a search-prompt with the transcript, the polar-query in natural language and a request for one or more related start-timestamps embedded therein; and (d) executing AI models with LLM with the search-prompt to yield a response and the one or more related start-timestamps, wherein when the response is affirmative, configuring the recording-player web-application to present an annotation-marker in each start-timestamp of the one or more related start-timestamps, via the UI that is associated to the recording-player web-application, on a timeline-bar, and wherein when the response is negative, configuring the recording-player web-application to present the response via the UI that is associated to the recording-player web-application; and (iii) configure the recording-player web-application to playback the media-file and present each point-in-time annotation of the one or more point-in-time annotations, upon a user-selection, via a User Interface (UI) that is associated to the recording-player web-application, on a timeline-bar as an annotation-marker, wherein each point-in-time annotation comprising a playhead position in the media-file and a text-annotation related to a parameter of the one or more parameters of the evaluation-measurement.

* * * * *